United States Patent
Kojoh et al.

(10) Patent No.: US 6,753,378 B2
(45) Date of Patent: Jun. 22, 2004

(54) BRANCHED POLYOLEFIN, PROCESS FOR PREPARING THE SAME, AND THERMOPLASTIC RESIN COMPOSITION CONTAINING BRANCHED POLYOLEFIN

(75) Inventors: Shinichi Kojoh, Sodegaura (JP); Tomoaki Matsugi, Sodegaura (JP); Norio Kashiwa, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 19 days.

(21) Appl. No.: 10/129,843

(22) PCT Filed: Aug. 31, 2001

(86) PCT No.: PCT/JP01/07554

§ 371 (c)(1),
(2), (4) Date: May 10, 2002

(87) PCT Pub. No.: WO02/22713

PCT Pub. Date: Mar. 21, 2002

(65) Prior Publication Data

US 2003/0023002 A1 Jan. 30, 2003

(30) Foreign Application Priority Data

Sep. 12, 2000 (JP) ........................................ 2000-276164
Sep. 12, 2000 (JP) ........................................ 2000-276165

(51) Int. Cl.$^7$ .............................................. C08G 63/48
(52) U.S. Cl. ............................ 525/7.4; 525/10; 525/55; 525/63; 525/64; 525/69; 525/70; 525/71; 525/74; 525/75; 525/78; 525/88
(58) Field of Search ............................ 525/7.4, 10, 55, 525/63, 64, 69, 70, 71, 74, 75, 78, 88

(56) References Cited

U.S. PATENT DOCUMENTS

| 4,382,128 A | 5/1983 | Li |
| 4,592,960 A | 6/1986 | Inoue et al. |
| 4,727,120 A | 2/1988 | Nogues |

FOREIGN PATENT DOCUMENTS

| JP | 60-233131 A | 11/1985 |
| JP | 2-276807 A | 11/1990 |
| JP | 7-011003 A | 1/1995 |
| JP | 7-165928 A | 6/1995 |
| WO | WO01/53369 A1 | 7/2001 |

*Primary Examiner*—Samuel A. Acquah
(74) *Attorney, Agent, or Firm*—Birch, Stewart, Kolasch & Birch, LLP

(57) ABSTRACT

The present invention is intended to provide a branched polyolefin having various excellent properties, a process for preparing the branched polyolefin and a thermoplastic resin composition containing the branched polyolefin. This branched polyolefin comprises an olefin chain (A) and olefin chain(s) (B) which have recurring units obtained from at least one olefin as main constituent units. In the branched polyolefin, the olefin chain (B) is linked to a position other than both ends of the olefin chain (A), and at least one olefin chain (B) per one olefin chain (A) is present. The process for preparing a branched polyolefin comprises allowing a functional group-containing polyolefin (C) having one or more carboxyl groups and/or acid anhydride groups at positions other than both ends to react with a terminal modified polyolefin (D) having a group capable of reacting with a carboxyl group or an acid anhydride group at only the position of chain end.

10 Claims, No Drawings

BRANCHED POLYOLEFIN, PROCESS FOR PREPARING THE SAME, AND THERMOPLASTIC RESIN COMPOSITION CONTAINING BRANCHED POLYOLEFIN

This application is the national phase under 35 U.S.C. §371 of PCT International Application No. PCT/JP01/07554 which has an International filing date of Aug. 31, 2001, which designated the United States of America.

FIELD OF THE INVENTION

The present invention relates to a branched polyolefin wherein at least one olefin chain is linked to a position other than both ends of another olefin chain having an olefin composition which is the same as or different from that of the previous olefin chain, and relates to a process for preparing the branched polyolefin and a thermoplastic resin composition containing the branched polyolefin.

BACKGROUND OF THE INVENTION

Since polyolefins have excellent processability, chemical resistance, electrical properties and mechanical properties, they are processed into extruded articles, injection molded articles, blow molded articles, films, sheets, etc., and applied to various uses.

In recent years, property requirements for polyolefins have been diversified, and polyolefins of various properties, e.g., polyolefins of excellent heat resistance and polyolefins having soft touch such as non-rigid polyvinyl chloride, are desired.

As methods to improve the properties of polyolefins, there are a method of controlling the type of a monomer or the molar ratio between monomers, a method of changing monomer arrangement, such as random or block arrangement, etc., and various methods have been attempted heretofore.

It is generally known that with respect to polyolefins containing ethylene as a main component, the polymer of a branched structure exhibits specific melt properties and is advantageous in the polymer molding. On this account, with respect to polyolefins containing an olefin of 3 or more carbon atoms as a main component, also the polymer of a branched structure is expected to have specific melt properties. When the composition of the olefin chain of the main chain is different from that of the olefin chain of the side chain, the polymer is also expected to function as a compatibilizing agent.

Under such circumstances as described above, the present inventors have studied, and as a result the inventors have found that a branched polyolefin wherein at least one olefin chain obtained from an olefin of 2 to 20 carbon atoms is linked to a position other than both ends of another olefin chain having an olefin composition which is the same as or different from that of the previous olefin chain has various excellent properties. Based on the finding, the present invention has been accomplished.

That is to say, it is an object of the present invention to provide a branched polyolefin having various excellent properties and a process for preparing the same. It is another object of the invention to provide a thermoplastic resin composition containing the branched polyolefin.

DISCLOSURE OF THE INVENTION

The branched polyolefin of the invention is a branched polyolefin comprising an olefin chain (A) having, as main constituent units, recurring units obtained from at least one olefin selected from olefins of 2 to 20 carbon atoms and olefin chain(s) (B) having, as main constituent units, recurring units obtained from at least one olefin selected from olefins of 2 to 20 carbon atoms and having an olefin composition which is the same as or different from that of the olefin chain (A), wherein the olefin chain (B) is linked to a position other than both ends of the olefin chain (A) through a bond having a carbonyl group, and at least one olefin chain (B) per one olefin chain (A) is present.

The branched polyolefin of the invention is, for example, a polyolefin wherein the weight-average molecular weight (Mw) of the olefin chain (B) is not less than 5,000, a polyolefin wherein the bond having a carbonyl group is an ester bond and/or an amide bond, a polyolefin wherein one of the olefin chain (A) and the olefin chain (B) is a crystalline polyolefin and the other is a non-crystalline polyolefin, a polyolefin wherein both the olefin chain (A) and the olefin chain (B) are polypropylene, or a polyolefin wherein both the olefin chain (A) and the olefin chain (B) have stereoregularity.

The process for preparing a branched polyolefin of the invention comprises allowing a functional group-containing polyolefin (C) having, as main constituent units, recurring units obtained from at least one olefin selected from olefins of 2 to 20 carbon atoms and having one or more carboxyl groups and/or acid anhydride groups at positions other than both ends to react with a terminal modified polyolefin (D) having, as main constituent units, recurring units obtained from at least one olefin selected from olefins of 2 to 20 carbon atoms, having an olefin composition which is the same as or different from that of the functional group-containing polyolefin (C) and having at least one group capable of reacting with a carboxyl group or an acid anhydride group at only the position of chain end to prepare the above-mentioned branched polyolefin.

The process for preparing a branched polyolefin of the invention is, for example, a process wherein the functional group-containing polyolefin (C) is a maleic anhydride-modified homopolymer or copolymer of ethylene and/or propylene, a process wherein the terminal modified polyolefin (D) is a one-side-end modified polyolefin having a group capable of reacting with a carboxyl group or an acid anhydride group at only one-side-end, or a process wherein the terminal modified polyolefin (D) is a maleic anhydride-modified homopolymer or copolymer of ethylene and/or propylene.

The thermoplastic resin composition of the invention contains the above-mentioned branched polyolefin in a content of 0.01 to 50% by weight.

PREFERRED EMBODIMENTS OF THE INVENTION

The branched polyolefin of the invention, the process for preparing the same and the thermoplastic resin composition containing the branched polyolefin are described in detail hereinafter.

The branched polyolefin of the invention comprises an olefin chain (A) having, as main constituent units, recurring units obtained from at least one olefin selected from olefins of 2 to 20 carbon atoms and olefin chain(s) (B) having, as main constituent units, recurring units obtained from at least one olefin selected from olefins of 2 to 20 carbon atoms and having an olefin composition which is the same as or different from that of the olefin chain (A), and the olefin chain (B) is linked to a position other than both ends of the olefin chain (A) through a bond having a carbonyl group.

The meaning of the expression "composition is the same" is as follows. When the olefin chain (A) is for example a homopolymer, the olefin chain (B) is a homopolymer composed of the same olefin as that of the olefin chain (A), and when the olefin chain (A) is for example a copolymer, the olefin chain (B) is a copolymer composed of the same combination of olefins as that of the olefin chain (A) and having almost the same comonomer content as that of the olefin chain (A). The meaning of the expression "composition is different" is as follows. At least one condition selected from the monomer type for forming the olefin chain, the comonomer type and the comonomer content is different. In the present invention, it is preferable that the composition is different.

The composition of the olefin chain (A) and the composition of the olefin chain (B) do not include the bond having a carbonyl group for linking the olefin chain (A) to the olefin chain (B).

The olefin of 2 to 20 carbon atoms is, for example, a straight-chain or branched α-olefin or a cycloolefin.

Examples of the straight-chain α-olefins include those of 2 to 20 carbon atoms, preferably 2 to 10 carbon atoms, such as ethylene, propylene, 1-butene, 1-pentene, 1-hexene, 1-octene, 1-decene, 1-dodecene, 1-tetradecene, 1-hexadecene, 1-octadecene and 1-eicosene.

Examples of the branched α-olefins include those of 4 to 20 carbon atoms, preferably 5 to 10 carbon atoms, such as 3-methyl-1-butene, 4-methyl-1-pentene, 3-methyl-1-pentene, 3-ethyl-1-pentene, 4,4-dimethyl-1-pentene, 4-methyl-1-hexene, 4,4-dimethyl-1-hexene, 4-ethyl-1-hexene and 3-ethyl-1-hexene.

Examples of the cycloolefins include those of 3 to 20 carbon atoms, preferably 3 to 10 carbon atoms, such as cyclopentene, cycloheptene, norbornene, 5-methyl-2-norbornene, tetracyclododecene and vinylcyclohexane.

When the composition of the olefin chain (A) and the composition of the olefin chain (B) are the same, the olefin chain (A) and the olefin chain (B) preferably have recurring units obtained from an olefin of 3 to 20 carbon atoms as main constituent units.

Although the olefin chain (A) and the olefin chain (B) have recurring units obtained from an olefin of 2 to 20 carbon atoms as main constituent units, they may contain recurring units obtained from a polymerizable monomer other than the olefin of 2 to 20 carbon atoms, such as a diene.

The olefin chain (A) and the olefin chain (B) may be formed from recurring units obtained from one olefin selected from the above olefins of 2 to 20 carbon atoms, or may be formed from recurring units obtained from two or more olefins selected from the above olefins of 2 to 20 carbon atoms.

When the olefin chain (A) and the olefin chain (B) are formed from recurring units obtained from two or more olefins selected from the above olefins of 2 to 20 carbon atoms, one of the olefins is desired to be contained in a content of usually not less than 60% by mol and less than 100% by mol, preferably 70 to 99% by mol, more preferably 75 to 98% by mol, and the other is an olefin selected from olefins of 2 to 20 carbon atoms other than the olefin described above and/or a polymerizable monomer other than the olefin of 2 to 20 carbon atoms.

The olefin chain (A) and the olefin chain (B) may have stereoregularity, and in this case, they may be any of isotactic and syndiotactic.

When the composition of the olefin chain (A) is the same as that of the olefin chain (B), the olefin chain (A) and the olefin chain (B) are preferably polypropylene, such as a propylene homopolymer or a propylene copolymer composed of propylene and an olefin of 4 to 20 carbon atoms, particularly preferably a propylene homopolymer. The olefin chain (A) and the olefin chain (B) preferably have stereoregularity, and in this case, they may be any of isotactic and syndiotactic. When the olefin chain (A) and the olefin chain (B) have stereoregularity, the olefin chain (A) and the olefin chain (B) are preferably isotactic.

When the composition of the olefin chain (A) is different from that of the olefin chain (B), it is preferable that one of the olefin chain (A) and the olefin chain (B) is a crystalline polyolefin and the other is a non-crystalline polyolefin. It is particularly preferable that the olefin chain (A) is a non-crystalline copolymer of ethylene and an olefin of 3 to 20 carbon atoms, such as an ethylene/propylene copolymer, or a non-crystalline copolymer of propylene and an olefin of 2 to 20 carbon atoms other than propylene, such as a propylene/ethylene copolymer, and that the olefin chain (B) is a crystalline polymer such as an ethylene homopolymer or a propylene homopolymer.

When the olefin composition of the olefin chain (A) is different from that of the olefin chain (B) in the branched polyolefin of the invention, examples of the olefin chains are as follows. When the olefin chain (A) is for example a homopolymer, the olefin chain (B) is a homopolymer or copolymer comprising a different olefin from that of the olefin chain (A), and when the olefin chain (A) is a copolymer, the olefin chain (B) is a copolymer of a different combination of olefins from that of the olefin chain (A) or a copolymer having the same combination of olefins as that of the olefin chain (A) but having a different monomer ratio, or a homopolymer.

The olefin chain (A) has a weight-average molecular weight (Mw) of usually 10,000 to 10,000,000, preferably 20,000 to 5,000,000, more preferably 50,000 to 1,000,000.

The olefin chain (B) preferably has 15 or more carbon atoms and has a weight-average molecular weight (Mw) of usually not less than 5,000, preferably 5,000 to 1,000,000, more preferably 10,000 to 500,000.

When the composition of the olefin chain (A) is different from that of the olefin chain (B), the weight-average molecular weight (Mw) of the olefin chain (B) is desired to be usually not less than 5,000, preferably 10,000 to 10,000,000, more preferably 15,000 to 1,000,000, still more preferably 20,000 to 500,000.

In the branched polyolefin of the invention, the olefin chain (B) is linked to a position other than both ends of the olefin chain (A) through a bond having a carbonyl group, and the number of the olefin chains (B) linked to the olefin chain (A) is not less than 1, preferably not less than 1.1, more preferably 1.5 to 100, still more preferably 2 to 50, based on one olefin chain (A).

Examples of the bonds having a carbonyl group include an ester bond, an amide bond, an imide bond, a urethane bond and a urea bond.

These bonds may be present singly or in combination of two or more kinds, and an ester bond and/or an amide bond is preferable.

The branched polyolefin of the invention has a melt flow rate (MFR, measured at 190° C. or 230° C. under a load of 2.16 kg in accordance with ASTM D 1238, the same shall apply hereinafter) of usually 0.001 to 3,000 g/10 min, preferably 0.005 to 1,000 g/10 min, more preferably 0.01 to 1,000 g/10 min, and a density (measured in accordance with ASTM D 1505, the same shall apply hereinafter) of usually 0.79 to 1.0 g/cm$^3$, preferably 0.75 to 0.98 g/cm$^3$, more preferably 0.80 to 0.96 g/cm$^3$.

When the composition of the olefin chain (A) is the same as that of the olefin chain (B), MFR of the branched polyolefin is desired to be in the range of usually 0.01 to 3,000 g/10 min, preferably 0.05 to 1,000 g/10 min, more preferably 0.1 to 500 g/10 min. When the composition of the olefin chain (A) is different from that of the olefin chain (B), MFR of the branched polyolefin is desired to be in the range of usually 0.001 to 1,000 g/10 min, preferably 0.005 to 500 g/10 min, more preferably 0.01 to 100 g/10 min.

Examples of preferred combinations of the olefin (A) and the olefin (B) are described below.

When the composition of the olefin chain (A) is the same as that of the olefin chain (B), the olefin chain (A) and the olefin chain (B) are preferably polypropylene, and in this case, the polypropylene preferably has a density of 0.880 to 0.960 g/cm$^3$, particularly 0.890 to 0.950 g/cm$^3$, and MFR of 0.05 to 1,000 g/10 min, particularly 0.1 to 500 g/10 min. When the polypropylene is a copolymer, the content of the copolymerized component is desired to be usually not more than 10% by mol, particularly not more than 5% by mol.

When the composition of the olefin chain (A) is different from that of the olefin chain (B), it is preferable that the olefin chain (A) is a copolymer of ethylene and an olefin of 3 to 20 carbon atoms and the olefin chain (B) is polypropylene. In this case, the copolymer of ethylene and an olefin of 3 to 20 carbon atoms, that is the olefin chain (A), has a density of 0.850 to 0.900 g/cm$^3$, preferably 0.858 to 0.898 g/cm$^3$, more preferably 0.855 to 0.895 g/cm$^3$, MFR of 0.1 to 50 g/10 min, preferably 0.2 to 40 g/10 min, more preferably 0.3 to 30 g/10 min, and a crystallinity, as measured by X rays, of less than 30%, preferably less than 28%, more preferably less than 25%. The polypropylene, that is the olefin chain (B), preferably has a density of 0.880 to 0.960 g/cm$^3$, particularly 0.890 to 0.950 g/cm$^3$, and MFR of 0.05 to 1,000 g/10 min, particularly 0.1 to 500 g/10 min. When the polypropylene is a copolymer, the content of the copolymerized component is desired to be usually not more than 10% by mol, particularly not more than 5% by mol.

Preparation

The branched polyolefin of the invention can be prepared by, for example, allowing a functional group-containing polyolefin (C) having, as main constituent units, recurring units obtained from at least one olefin selected from olefins of 2 to 20 carbon atoms and having one or more carboxyl groups and/or acid anhydride groups at positions other than both ends to react with at least one terminal modified polyolefin (D) having, as main constituent units, recurring units obtained from at least one olefin selected from olefins of 2 to 20 carbon atoms, having an olefin composition which is the same as or different from that of the olefin chain (C) and having at least one group capable of reacting with a carboxyl group or an acid anhydride group at only the position of chain end.

(C) Functional Group-containing Polyolefin

The functional group-containing polyolefin (C) is a polyolefin having one or more carboxyl groups and/or acid anhydride groups at positions other than both ends. The functional group-containing polyolefin (C) becomes the olefin chain (A), and the carboxyl group and/or the acid anhydride group becomes a bond having a carbonyl group for linking the olefin chain (A) to the olefin chain (B).

The functional group-containing polyolefin (C) is obtained by graft modifying a part or the whole of an unmodified polyolefin with an unsaturated carboxylic acid or its derivative.

The unmodified polyolefin can be prepared by polymerizing or copolymerizing the aforesaid olefin of 2 to 20 carbon atoms using a hitherto known catalyst. Examples of the hitherto known catalysts include a magnesium-supported titanium catalyst system and a metallocene catalyst.

These catalysts are described below.

Magnesium-supported Titanium Catalyst System

The magnesium-supported titanium catalyst system is preferably a catalyst system comprising a solid titanium catalyst component (I) containing titanium, magnesium and halogen as essential ingredients, an organometallic compound catalyst component (II), and if necessary, an electron donor (III).

(I) Solid Titanium Catalyst Component

The solid titanium catalyst component (I) can be prepared by contacting the below-described magnesium compound, titanium compound and electron donor with each other.

Magnesium Compound

The magnesium compound is a magnesium compound having reducing ability or a magnesium compound having no reducing ability.

The magnesium compound having reducing ability is, for example, an organomagnesium compound represented by the following formula:

wherein n is a number of $0 \leq n < 2$, R is hydrogen, an alkyl group of 1 to 20 carbon atoms, an aryl group or a cycloalkyl group, when n is 0, two of R may the same or different, and X is a halogen.

Examples of the organomagnesium compounds having reducing ability include alkylmagnesium compounds, such as dimethylmagnesium, diethylmagnesium, dipropylmagnesium, dibutylmagnesium, diamylmagnesium, dihexylmagnesium, didecylmagnesium, octylbutylmagnesium and ethylbutylmagnesium; alkylmagnesium halides, such as ethylmagnesium chloride, propylmagnesium chloride, butylmagnesium chloride, hexylmagnesium chloride and amylmagnesium chloride; alkylmagnesium alkoxides, such as butylethoxymagnesium, ethylbutoxymagnesium and octylbutoxymagnesium; butylmagnesium hydride; and magnesium hydride.

Metallic Magnesium is also Employable.

Examples of the magnesium compounds having no reducing ability include magnesium halides, such as magnesium chloride, magnesium bromide, magnesium iodide and magnesium fluoride; alkoxymagnesium halides, such as methoxymagnesium chloride, ethoxymagnesium chloride, isopropoxymagnesium chloride, butoxymagnesium chloride and octoxymagnesium chloride; aryloxymagnesium halides, such as phenoxymagnesium chloride and methylphenoxymagnesium chloride; dialkoxymagnesiums, such as diethoxymagnesium, diisopropoxymagnesium, dibutoxymagnesium, di-n-octoxymagnesium, di-2- ethylhexoxymagnesium and methoxyethoxymagnesium; diaryloxymagnesiums, such as diphenoxymagnesium, dimethylphenoxymagnesium and phenoxymethylphenoxymagnesium; and carboxylic acid salts of magnesium, such as magnesium laurate and magnesium stearate.

The magnesium compound having no reducing ability may be a compound derived from the magnesium compound having reducing ability or a compound derived during the preparation of the catalyst component. In order to derive the magnesium compound having no reducing ability from the magnesium compound having reducing ability, the magnesium compound having reducing ability has only to be contacted with, for example, a polysiloxane compound, a halogen-containing silane compound, a halogen-containing aluminum compound, en ester, an alcohol, a halogen-containing compound or a compound having an OH group or an active carbon-oxygen bond.

The magnesium compound having reducing ability and the magnesium compound having no reducing ability may form a complex compound or a double compound together with another metal such as aluminum, zinc, boron, beryllium, sodium or potassium, or may be a mixture of the magnesium compound and another metallic compound. The magnesium compounds may be used singly or in combination of two or more kinds.

Of the above magnesium compounds, a solid magnesium compound can be made liquid by the use of an electron donor (i). Examples of the electron donors (i) include alcohols, phenols, ketones, aldehydes, ethers, amines, pyridines and metallic acid esters.

Specifically, there can be mentioned:
alcohols of 1 to 18 carbon atoms, such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol and isopropylbenzyl alcohol;
halogen-containing alcohols of 1 to 18 carbon atoms, such as trichloromethanol, trichloroethanol and trichlorohexanol;
alkoxy alcohols, such as 2-propoxyethanol, 2-butoxyethanol, 2-ethoxypropanol, 3-ethoxypropanol, 1-methoxybutanol, 2-methoxybutanol and 2-ethoxybutanol;
phenols of 6 to 20 carbon atoms, which may have a lower alkyl group, such as phenol, cresol, xylenol, ethylphenol, propylphenol, nonylphenol, cumylphenol and naphthol;
ketones of 3 to 15 carbon atoms, such as acetone, methyl ethyl ketone, methyl isobutyl ketone, acetophenone, benzophenone and benzoquinone;
aldehydes of 2 to 15 carbon atoms, such as acetaldehyde, propionaldehyde, octylaldehyde, benzaldehyde, tolualdehyde and naphthaldehyde;
ethers of 2 to 20 carbon atoms, such as methyl ether, ethyl ether, isopropyl ether, butyl ether, amyl ether, tetrahydrofuran, anisole and diphenyl ether;
amines, such as trimethylamine, triethylamine, tributylamine, tribenzylamine and tetramethylethylenediamine; and
pyridines, such as pyridine, methylpyridine, ethylpyridine and dimethylpyridine; and
metallic acid esters, such as tetraethoxytitanium, tetra-n-propoxytitanium, tetra-i-propoxytitanium, tetrabutoxytitanium, tetrahexoxytitanium, tetrabutoxyzirconium and tetraethoxyzirconium.

These may be used singly or in combination of two or more kinds.

Of these, alcohols, alkoxy alcohols and metallic acid esters are particularly preferably employed. The solubilization reaction of the solid magnesium compound by the electron donor (i) is generally carried out by contacting the solid magnesium compound with the electron donor (i), followed by heating if necessary. In this case, the contact temperature is in the range of 0 to 200° C., preferably 20 to 180° C., more preferably 50 to 150° C.

In the solubilization reaction, a hydrocarbon solvent or the like may be present. Examples of the hydrocarbon solvents include aliphatic hydrocarbons, such as pentane, hexane, heptane, octane, decane, dodecane, tetradecane and kerosine; alicyclic hydrocarbons, such as cyclopentane, methylcyclopentane, cyclohexane, methylcyclohexane, cyclooctane and cyclohexene; aromatic hydrocarbons, such as benzene, toluene and xylene; and halogenated hydrocarbons, such as dichloroethane, dichloropropane, trichloroethylene, chlorobenzene and 2,4-dichlorotoluene.

As the magnesium compound used for preparing the solid titanium catalyst component (I), many magnesium compounds other than those described above are also employable. In the solid titanium catalyst component (I) finally obtained, however, the magnesium compound is preferably present in the form of a halogen-containing magnesium compound. Therefore, if a magnesium compound containing no halogen is used, it is preferable to contact the magnesium compound with a halogen-containing compound during the course of the preparation.

Of the above compounds, magnesium compounds having no reducing ability are preferably contained in the component (I), and of these, halogen-containing magnesium compounds are particularly preferably contained. Of these, magnesium chloride, alkoxymagnesium chloride or aryloxymagnesium chloride is preferably contained.

Titanium Compound

As the titanium compound, a tetravalent titanium compound is preferably employed. The tetravalent titanium compound is, for example, a compound represented by the following formula:

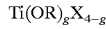

$$Ti(OR)_g X_{4-g}$$

wherein R is a hydrocarbon group, X is a halogen, and $0 \leq g \leq 4$.

Examples of such compounds include:
titanium tetrahalides, such as $TiCl_4$, $TiBr_4$ and $TiI_4$;
alkoxytitanium trihalides, such as $Ti(OCH_3)Cl_3$, $Ti(OC_2H_5)Cl_3$, $Ti(O\text{-}n\text{-}C_4H_9)Cl_3$, $Ti(OC_2H_5)Br_3$ and $Ti(O\text{-}iso\text{-}C_4H_9)Br_3$;
dialkoxytitanium dihalides, such as $Ti(OCH_3)_2Cl_2$, $Ti(OC_2H_5)_2Cl_2$, $Ti(O\text{-}n\text{-}C_4H_9)_2Cl_2$ and $Ti(OC_2H_5)_2Br_2$;
trialkoxytitanium monohalides, such as $Ti(OCH_3)_3Cl$, $Ti(OC_2H_5)_3Cl$, $Ti(O\text{-}n\text{-}C_4H_9)_3Cl$ and $Ti(OC_2H_5)_3Br$; and
tetraalkoxytitaniums, such as $Ti(OCH_3)_4$, $Ti(OC_2H_5)_4$, $Ti(O\text{-}n\text{-}C_4H_9)_4$, $Ti(O\text{-}iso\text{-}C_4H_9)_4$ and $Ti(O\text{-}2\text{-}ethylhexyl)_4$.

Of these, titanium tetrahalides are preferable, and titanium tetrachloride is particularly preferable. These titanium compounds may be used singly or in combination of two or more kinds. The titanium compound may be used together with an aromatic hydrocarbon, or may be used, diluting with a hydrocarbon or a halogenated hydrocarbon.

(ii) Electron Donor

In the preparation of the solid titanium catalyst component (I), an electron donor (ii) is preferably employed. Examples of the electron donors (ii) include the following acid halides, acid amides, nitrites, acid anhydrides, organic acid esters and polyethers.

Specifically, there can be mentioned:

acid halides of 2 to 15 carbon atoms, such as acetyl chloride, benzoyl chloride, toluyl chloride and anisoyl chloride;

acid amides, such as N,N-dimethylacetamide, N,N-diethylbenzamide and N,N-dimethyltoluamide;

nitrites, such as acetonitrile, benzonitrile and tolunitrile;

acid anhydrides, such as acetic anhydride, phthalic anhydride and benzoic anhydride; and organic acid esters of 2 to 18 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, ethyl anisate, ethyl ethoxybenzoate, γ-butyrolactone, δ-valerolactone, cumarin, phthalide and ethyl carbonate.

Preferred examples of the organic esters include polycarboxylates having skeletons represented by the following formulas:

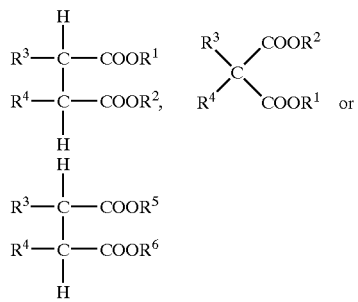

In the above formulas, $R^1$ is a substituted or unsubstituted hydrocarbon group, and $R^2$, $R^5$ and $R^6$ are hydrogen or a substituted or unsubstituted hydrocarbon group. $R^3$ and $R^4$ are hydrogen or a substituted or unsubstituted hydrocarbon group, and preferably at least one of them is a substituted or unsubstituted hydrocarbon group. $R^3$ and $R^4$ may be bonded to form a cyclic structure. The substituent of the substituted hydrocarbon groups $R^1$ to $R^6$ has a hetero atom such as N, O or S, and has, for example, a group of C—O—C, COOR, COOH, OH, SO$_3$H, —C—N—C— or NH$_2$.

Examples of such polycarboxylates include aliphatic polycarboxylates, alicyclic polycarboxylates, aromatic polycarboxylates and heterocyclic polycarboxylates.

Preferred examples of the polycarboxylates having skeletons represented by the above formulas include:

diethyl succinate, dibutyl succinate, diethyl methylsuccinate, diaryl methylsuccinate, diisobutyl α-methylglutarate, diisopropyl β-methylglutarate, diisobutyl methylmalonate, dibutyl ethylmalonate, diethyl ethylmalonate, diethyl isopropylmalonate, dibutyl isopropylmalonate, dibutyl butylmalonate, dibutyl phenylmalonate, diethyl diethylmalonate, dibutyl dibutylmalonate, diethyl dibutylmalonate, n-butyl maleate, dibutyl methylmaleate, dibutyl butylmaleate, di-2-ethylhexyl fumarate, di-n-hexyl cyclohexenecaboxylate, diethyl nadiate, diisopropyl tetrahydrophthalate, diethyl phthalate, monoethyl phthalate, dipropyl phthalate, diisobutylphthalate, diisopropyl phthalate, ethylisobutyl phthalate, di-n-butyl phthalate, di-n-heptyl phthalate, di-n-octyl phthalate, di-2-ethylhexyl phthalate, di(2-methylpentyl)phthalate, di(3-methylpentyl)phthalate, di(4-methylpentyl)phthalate, di(2,3-dimethylbutyl) phthalate, di(3-methylhexyl)phthalate, di(4-methylhexyl)phthalate, di(5-methylhexyl)phthalate, di(3-ethylpentyl)phthalate, di(3,4-dimethylpentyl) phthalate, di(2,4-dimethylpentyl)phthalate, di(2-methylhexyl)phthalate, di(2-methyloctyl)phthalate, didecyl phthalate, diphenyl phthalate and mixtures of these phthalic acid diesters; and diethyl naphthalenedicarboxylate, dibutyl naphthalenedicarboxylate, triethyl trimellitate, tributyl trimellitate, dibutyl 3,4-furandicarboxylate, diethyl adipate, dibutyl adipate, dioctyl sebacate and dibutyl sebacate.

Of these, phthalic acid diesters are preferably employed.

Also employable as the electron donor is a compound having two or more ether bonds present through plural atoms (sometimes referred to as a "polyether" hereinafter). The polyether is, for example, a compound wherein the atoms present between the ether bonds are carbon, silicon, oxygen, nitrogen, phosphorus, boron and sulfur, or two or more atoms selected from these atoms. Such a compound is preferably a compound wherein relatively bulky substituents are bonded to the atoms between the ether bonds and the atoms present between two or more ether bonds include plural carbon atoms, e.g., a polyether represented by the following formula:

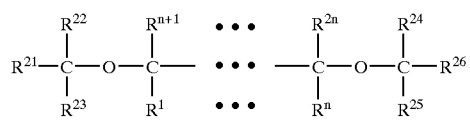

wherein n is an integer of $2 \leq n \leq 10$, $R^1$ to $R^{26}$ are a substituent having at least one element selected from carbon, hydrogen, oxygen, halogen, nitrogen, sulfur, phosphorus, boron and silicon, arbitrary $R^1$ to $R^{26}$, preferably $R^1$ to $R^{2n}$, may form a ring other than a benzene ring in cooperation, and the main chain may contain an atom other than carbon.

Examples of such polyether compounds include 2-(2-ethylhexyl)-1,3-dimethoxypropane, 2-isopropyl-1,3-dimethoxypropane, 2-butyl-1,3-dimethoxypropane, 2-s-butyl-1,3-dimethoxypropane, 2-cyclohexyl-1,3-dimethoxypropane, 2-phenyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2-(1-naphthyl)-1,3-dimethoxypropane, 2-(2-fluorophenyl)-1,3-dimethoxypropane, 2-(1-decahydronaphthyl)-1,3-dimethoxypropane,
2-(p-t-butylphenyl)-1,3-dimethoxypropane,
2,2-dicyclohexyl-1,3-dimethoxypropane,
2,2-diethyl-1,3-dimethoxypropane,
2,2-dipropyl-1,3-dimethoxypropane,
2,2-dibutyl-1,3-dimethoxypropane,
2-methyl-2-propyl-1,3-dimethoxypropane,
2-methyl-2-benzyl-1,3-dimethoxypropane,
2-methyl-2-ethyl-1,3-dimethoxypropane,
2-methyl-2-isopropyl-1,3-dimethoxypropane,
2-methyl-2-phenyl-1,3-dimethoxypropane,
2-methyl-2-cyclohexyl-1,3-dimethoxypropane,
2,2-bis(p-chlorophenyl)-1,3-dimethoxypropane,
2,2-bis(2-cyclohexylethyl)-1,3-dimethoxypropane,
2-methyl-2-isobutyl-1,3-dimethoxypropane,
2-methyl-2-(2-ethylhexyl)-1,3-dimethoxypropane,
2,2-diisobutyl-1,3-dimethoxypropane,
2,2-diphenyl-1,3-dimethoxypropane,
2,2-dibenzyl-1,3-dimethoxypropane,
2,2-bis(cyclohexylmethyl)-1,3-dimethoxypropane,
2,2-diisobutyl-1,3-diethoxypropane,
2,2-diisobutyl-1,3-dibutoxypropane,
2-isobutyl-2-isopropyl-1,3-dimethoxypropane,
2,2-di-s-butyl-1,3-dimethoxypropane,
2,2-di-t-butyl-1,3-dimethoxypropane,
2,2-dineopentyl-1,3-dimethoxypropane,
2-isopropyl-2-isopentyl-1,3-dimethoxypropane,
2-phenyl-2-benzyl-1,3-dimethoxypropane,
2-cyclohexyl-2-cyclohexylmethyl-1,3-dimethoxypropane,
2,3-diphenyl-1,4-diethoxybutane,
2,3-dicyclohexyl-1,4-diethoxybutane,
2,2-dibenzyl-1,4-diethoxybutane,
2,3-diisopropyl-1,4-diethoxybutane,
2,2-bis(p-methylphenyl)-1,4-dimethoxybutane,
2,3-bis(p-chlorophenyl)-1,4-dimethoxybutane,
2,3-bis(p-fluorophenyl)-1,4-dimethoxybutane,
2,4-diphenyl-1,5-dimethoxypentane,
2,5-diphenyl-1,5-dimethoxyhexane,
2,4-diisopropyl-1,5-dimethoxypentane,
2,4-diisobutyl-1,5-dimethoxypentane,
2,4-diisoamyl-1,5-dimethoxypentane,
3-methoxymethyltetrahydrofuran,
3-methoxymethyldioxane,
1,2-diisobutoxypropane,
1,2-diisobutoxyethane,
1,3-diisoamyloxyethane,
1,3-diisoamyloxypropane,
1,3-diisoneopentyloxyethane,
1,3-dineopentyloxypropane,
2,2-tetramethylene-1,3-dimethoxypropane,
2,2-pentamethylene-1,3-dimethoxypropane,
2,2-hexamethylene-1,3-dimethoxypropane,
1,2-bis(methoxymethyl)cyclohexane,
2,8-dioxaspiro[5,5]undecane,
3,7-dioxabicyclo[3,3,1]nonane,
3,7-dioxabicyclo[3,3,0]octane,
3,3-diisobutyl-1,5-oxononane,
6,6-diisobutyldioxyheptane,
1,1-dimethoxymethylcyclopentane,
1,1-bis(dimethoxymethyl)cyclohexane,
1,1-bis(methoxymethyl)bicyclo[2,2,1]heptane,
1,1-dimethoxymethylcyclopentane,
2-methyl-2-methoxymethyl-1,3-dimethoxypropane,
2-cyclohexyl-2-ethoxymethyl-1,3-diethoxypropane,
2-cyclohexyl-2-methoxymethyl-1,3-dimethoxypropane,
2,2-diisobutyl-1,3-dimethoxycyclohexane,
2-isopropyl-2-isoamyl-1,3-dimethoxycyclohexane,
2-cyclohexyl-2-methoxymethyl-1,3-dimethoxycyclohexane,
2-isopropyl-2-methoxymethyl-1,3-dimethoxycyclohexane,
2-isobutyl-2-methoxymethyl-1,3-dimethoxycyclohexane,
2-cyclohexyl-2-ethoxymethyl-1,3-diethoxycyclohexane,
2-cyclohexyl-2-ethoxymethyl-1,3-dimethoxycyclohexane,
2-isopropyl-2-ethoxymethyl-1,3-diethoxycyclohexane,
2-isopropyl-2-ethoxymethyl-1,3-dimethoxycyclohexane,
2-isobutyl-2-ethoxymethyl-1,3-diethoxycyclohexane and
2-isobutyl-2-ethoxymethyl-1,3-dimethoxycyclohexane.
Also available as the polyethers are
tris(p-methoxyphenyl)phosphine,
methylphenylbis(methoxymethyl)silane,
diphenylbis(methoxymethyl)silane,
methylcyclohexylbis(methoxymethyl)silane,
di-t-butylbis(methoxymethyl)silane,
cyclohexyl-t-butylbis(methoxymethyl)silane,
i-propyl-t-butylbis(methoxymethyl)silane or the like.

Of these, 2,2-diisobutyl-1,3-dimethoxypropane, 2-isopropyl-2-isobutyl-1,3-dimethoxypropane, 2-isopropyl-2-isopentyl-1,3-dimethoxypropane, 2,2-dicyclohexyl-1,3-dimethoxypropane and 2,2-bis(cyclohexylmethyl)-1,3-dimethoxypropane are preferably employed.

As the electron donors (ii), organic acid esters and polyethers are preferable, and aromatic diesters, such as phthalic acid diesters, and polyethers are more preferable. The electron donors mentioned above can be used in combination of two or more kinds. The electron donors exemplified above have only to be finally contained in the solid titanium catalyst component (I). In the preparation of the solid titanium catalyst component (I), therefore, the above compounds are not always used as such, and other compounds capable of producing the above compounds in the course of the preparation of the solid titanium catalyst component (I) may be used. Also in this case, other compounds can be used so as to produce two or more kinds of the electron donors (ii).

Preparation of Solid Titanium Catalyst Component (I)

The process for preparing the solid titanium catalyst component (I) from the aforesaid compounds is not specifically restricted, and for example, the following processes are available. As the organometallic compound in the following processes, the same compound as the later-described organometallic compound (II) is used.

(1) A liquid magnesium compound consisting essentially of the magnesium compound, the electron donor (i) and the hydrocarbon solvent is contacted with a liquid titanium compound, after or with precipitating a solid by contacting the liquid magnesium compound with an organometallic compound if necessary, and the resulting solid component is contacted with an aromatic hydrocarbon, a liquid titanium compound and an electron donor (ii) at least once. It is preferable to carry out the contact of the solid component with the aromatic hydrocarbon and the liquid titanium compound plural times.

(2) A contact product of an inorganic carrier or an organic carrier with a liquid organomagnesium compound is contacted with a liquid titanium compound, after or with precipitating a solid by contacting the contact product with an organometallic compound if necessary, and the resulting solid component is contacted with an aromatic hydrocarbon, a liquid titanium compound and an electron donor (ii) at least once. In this process, the contact product may be previously contacted with a halogen-containing compound and/or an organometallic compound. It is preferable to carry out the contact of the solid component with the aromatic hydrocarbon and the liquid titanium compound plural times.

(II) Organometallic Compound Catalyst Component

The organometallic compound catalyst component (II) is preferably one containing a metal selected from Group 13 of the periodic table, and preferred examples thereof include an organoaluminum compound, an organoboron compound and an alkyl complex compound of a Group 1 element and aluminum or boron. The organoaluminum compound is, for example, an organoaluminum compound represented by the following formula:

$$R^a_n AlX_{3-n}$$

wherein $R^a$ is a hydrocarbon group of 1 to 12 carbon atoms, X is a halogen or hydrogen, n is 1 to 3.

$R^a$ is a hydrocarbon group of 1 to 12 carbon atoms, such as an alkyl group, a cycloalkyl group or an aryl group. Specific examples of such groups include methyl, ethyl, n-propyl, isopropyl, isobutyl, pentyl, hexyl, octyl, cyclopentyl, cyclohexyl, phenyl and tolyl.

Examples of the organoaluminum compounds include:

trialkylaluminums, such as trimethylaluminum, triethylaluminum, triisopropylaluminum, triisobutylaluminum, trioctylaluminum and tri-2-ethylhexylaluminum;

trialkenylaluminums, such as triisoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride, diisobutylaluminum hydride and ethylaluminum dihydride.

Also employable as the organoaluminum compound is a compound represented by the following formula.

$$R^a_n AlY_{3-n}$$

In the above formula, $R^a$ is the same as described above, Y is $-OR^b$, $-OSiR^c_3$, $-OAR^d_2$, $-NR^e_2$, $-SiR^f_3$ or $-N(R^g)AlR^h_2$, and n is 1 to 2.

$R^b$, $R^c$, $R^d$ and $R^h$ are methyl, ethyl, isopropyl, isobutyl, cyclohexyl, phenyl or the like, $R^e$ is hydrogen, methyl, ethyl, isopropyl, phenyl, trimethylsilyl or the like, and $R^f$ and $R^g$ are methyl, ethyl or the like.

Examples of such organoaluminum compounds include the following compounds:

(i) compounds represented by $R^a_n Al(OR^b)_{3-n}$, such as dimethylaluminum methoxide, diethylaluminum ethoxide and diisobutylaluminum methoxide;

(ii) compounds represented by $R^a_n Al(OSiR^c)_{3-n}$, such as $Et_2Al(OSiMe_3)$, $(iso-Bu)_2Al(OSiMe_3)$ and $(iso-Bu)_2Al(OSiEt_3)$;

(iii) compounds represented by $R^a_n Al(OAlR^d_2)_{3-n}$, such as $Et_2AlOAlEt_2$ and $(iso-Bu)_2AlOAl(iso-Bu)_2$;

(iv) compounds represented by $R^a_n Al(NR^e_2)_{3-n}$, such as $Me_2AlNEt_2$, $Et_2AlNHMe$, $Me_2AlNHEt$, $Et_2AlN(Me_3Si)_2$ and $(iso-Bu)_2AlN(Me_3Si)_2$;

(v) compounds represented by $R^a_n Al(SiR^f_3)_{3-n}$, such as $(iso-Bu)_2AlSiMe_3$; and (vi) compounds represented by $R^a_n Al[N(R^g)-AlR^h_2]_{3-n}$, such as $Et_2AlN(Me)-AlEt_2$ and $(iso-Bu)_2AlN(Et)Al(iso-Bu)_2$.

Also available are compounds analogous to the above compounds, such as organoaluminum compounds wherein two or more aluminum atoms are bonded through an oxygen atom or a nitrogen atom. Examples of such compounds include $(C_2H_5)_2AlOAl(C_2H_5)_2$, $(C_4H_9)_2AlOAl(C_4H_9)_2$ and $(C_2H_5)_2AlN(C_2H_5)Al(C_2H_5)_2$. Aluminoxanes (organoaluminum oxy-compounds), such as methylaluminoxane, are also available.

An organoaluminum compound represented by the following formula is also employable.

$$R^a AlXY$$

wherein $R^a$, X and Y are the same as described above.

Examples of the organoboron compounds include triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron, tris(3,5-dimethylphenyl)boron, hexylborane, dicyclohexylborane, diamylborane, diisopinocamphenylborane, 9-borabicyclo[3.3.1]nonane, catechol borane, B-bromo-9-borabicyclo[3.3.1]nonane, borane-triethylamine complex and borane-methyl sulfide complex.

An ionic compound may be used as the organoboron compound. Examples of such compounds include triethylammoniumtetra(phenyl)boron, tripropylammoniumtetra(phenyl)boron, trimethylammoniumtetra(p-tolyl)boron, trimethylammoniumtetra(o-tolyl)boron, tri(n-butyl)ammoniumtetra(pentafluorophenyl)boron, tripropylammoniumtetra(o,p-dimethylphenyl)boron, tri(n-butyl)ammoniumtetra(p-trifluoromethylphenyl)boron, N,N-dimethylaniliniumtetra(phenyl)boron, dicyclohexylammoniumtetra(phenyl)boron, triphenylcarbeniumtetrakis(pentafluorophenyl)borate, N,N-dimethylaniliniumtetrakis(pentafluorophenyl)borate, bis[tri(n-butyl)ammonium]nonaborate and
bis[tri(n-butyl)ammonium]decaborate.

The alkyl complex compound of a Group 1 element and aluminum is, for example, a compound represented by the following formula:

wherein $M^1$ is Li, Na or K, and $R^j$ is a hydrocarbon group of 1 to 15 carbon atoms.

Examples of such compounds include $LiAl(C_2H_5)_4$ and $LiAl(C_7H_{15})_4$.

Examples of the organoboron compounds and the alkyl complex compounds of a Group 1 element and boron include compounds having a structure wherein aluminum is replaced with boron in the aforesaid organoaluminum compounds and in the alkyl complex compounds of a Group 1 element and aluminum, respectively.

(III) Electron Donor

As the electron donor (III), the compound previously exemplified as the electron donor (ii) that is used for preparing the solid titanium catalyst component (I) is employable, and an organosilicon compound represented by the following formula is also employable.

wherein R and R' are hydrocarbon groups, and 0<n<4.

Examples of the organosilicon compounds represented by the above formula include trimethylmethoxysilane,
trimethylethoxysilane, dimethyldimethoxysilane,
dimethyldiethoxysilane, diisopropyldimethoxysilane,
tert-butylmethyldimethoxysilane,
t-butylmethyldiethoxysilane, tert-amylmethyldiethoxysilane,
diphenyldimethoxysilane, phenylmethyldimethoxysilane,
diphenyldiethoxysilane, bis-o-tolyldimethoxysilane,
bis-m-tolyldimethoxysilane, bis-p-tolyldimethoxysilane,
bis-p-tolyldiethoxysilane,
bisethylphenyldimethoxysilane,
dicyclohexyldimethoxysilane,
cyclohexylmethyldimethoxysilane,
cyclohexylmethyldiethoxysilane, ethyltrimethoxysilane,
ethyltriethoxysilane, vinyltrimethoxysilane,
methyltrimethoxysilane, n-propyltriethoxysilane,
decyltrimethoxysilane, decyltriethoxysilane,
phenyltrimethoxysilane, γ-chloropropyltrimethoxysilane,
methyltriethoxysilane, ethyltriethoxysilane,
vinyltriethoxysilane, tert-butyltriethoxysilane,
n-butyltriethoxysilane, iso-butyltriethoxysilane,
phenyltriethoxysilane, γ-aminopropyltriethoxysilane,
chlorotriethoxysilane, ethyltriisopropoxysilane,
vinyltributoxysilane, cyclohexyltrimethoxysilane,
cyclohexyltriethoxysilane,
2-norbornanetrimethoxysilane,
2-norbornanetriethoxysilane,
2-norbornanemethyldimethoxysilane, ethyl silicate, butyl silicate, trimethylphenoxysilane, methyltriallyloxysilane, vinyltris(β-methoxyethoxysilane), vinyltriacetoxysilane, dimethyltetraethoxydisiloxane,
cyclopentyltrimethoxysilane,
2-methylcyclopentyltrimethoxysilane,
2,3-dimethylcyclopentyltrimethoxysilane,
cyclopentyltriethoxysilane,
dicyclopentyldimethoxysilane,
bis(2-methylcyclopentyl)dimethoxysilane,
bis(2,3-dimethylcyclopentyl)dimethoxysilane,
dicyclopentyldiethoxysilane,
tricyclopentylmethoxysilane,
tricyclopentylethoxysilane,
dicyclopentylmethylmethoxysilane,
dicyclopentylethylmethoxysilane,
hexenyltrimethoxysilane,
dicyclopentylmethylethoxysilane,
cyclopentyldimethylmethoxysilane,
cyclopentyldiethylmethoxysilane and
cyclopentyldimethylethoxysilane.

Of these, preferably used are ethyltriethoxysilane, n-propyltriethoxysilane, tert-butyltriethoxysilane, vinyltriethoxysilane, phenyltriethoxysilane, vinyltributoxysilane, diphenyldimethoxysilane,
phenylmethyldimethoxysilane, bis-p-tolyldimethoxysilane,
p-tolylmethyldimethoxysilane,
dicyclohexyldimethoxysilane,
cyclohexylmethyldimethoxysilane,
2-norbornanetriethoxysilane,
2-norbornanemethyldimethoxysilane,
phenyltriethoxysilane,
dicyclopentyldimethoxysilane, hexenyltrimethoxysilane,
cyclopentyltriethoxysilane, tricyclopentylmethoxysilane and
cyclopentyldimethylmethoxysilane.

Also employable as the electron donors (III) are nitrogen-containing electron donors, such as 2,6-substituted piperidines, 2,5-substituted piperidines, substituted methylenediamines, specifically N,N,N',N'-tetramethylmethylenediamine and N,N,N',N'-tetraethylmethylenediamine, and substituted imidazolidines, specifically 1,3-dibenzylimidazolidine and 1,3-dibenzyl-2-phenylimidazolidine; phosphorus-containing electron donors, such as phosphates, specifically triethyl phosphite, tri-n-propyl phosphite, triisopropyl phosphite, tri-n-butyl phosphite, triisobutyl phosphite, diethyl-n-butyl phosphite and diethylphenyl phosphite; and oxygen-containing electron donors, such as 2,6-substituted tetrahydropyrans and 2,5-substituted tetrahydropyrans. The electron donors (III) mentioned above can be used in combination of two or more kinds.

Metallocene Catalyst

The Metallocene Catalyst is Described

There is no specific limitation on the metallocene catalyst for use in the preparation of the unmodified polyolefin, and a metallocene catalyst publicly known is employable. Examples of the publicly known metallocene catalysts include compounds of transition metals such as titanium, vanadium, chromium, zirconium and hafnium, and any of the compounds, which are liquid or solid under the use conditions, can be employed. The transition metal compound does not need to be a single compound, and the compound may be supported on another compound or may be a homogeneous mixture with another compound or may be a complex compound or a double compound with another compound.

Of the publicly known metallocene catalysts, a metallocene compound of a chiral structure having C2 symmetry or C1 symmetry is preferably employed.

Examples of the metallocene compounds of a chiral structure having C2 symmetry include rac-ethylene-bis(indenyl)zirconium dichloride, rac-ethylene-bis(tetrahydroindenyl)zirconium dichloride, rac-dimethylsilyl-bis(2,3,5-trimethylcyclopentadienyl) zirconium dichloride, rac-dimethylsilyl-bis[1-(4-phenylindenyl)]zirconium dichloride, rac-dimethylsilyl-bis[1-(2-methyl-4-phenylindenyl)] zirconium dichloride, rac-dimethylsilyl-bis{1-[2-methyl-4-(1-naphthyl) indenyl]}zirconium dichloride, rac-dimethylsilyl-bis{1-[2-methyl-4-(2-naphthyl) indenyl]}zirconium dichloride, rac-dimethylsilyl-bis{1-[2-methyl-4-(1-anthryl)indenyl] }zirconium dichloride, rac-dimethylsilyl-bis{1-[2-methyl-4-(9-anthryl)indenyl] }zirconium dichloride, rac-dimethylsilyl-bis{1-[2-methyl-4-(9-phenanthryl) indenyl]}zirconium dichloride, rac-dimethylsilyl-bis{1-[2-methyl-4-(o-chlorophenyl) indenyl]}zirconium dichloride, rac-dimethylsilyl-bis{1-[2-methyl-4-(pentafluorophenyl) indenyl]}zirconium dichloride, rac-dimethylsilyl-bis[1-(2-ethyl-4-phenylindenyl)] zirconium dichloride, rac-dimethylsilyl-bis{1-[2-ethyl-4-(1-naphthyl)indenyl] }zirconium dichloride, rac-dimethylsilyl-bis{1-[2-ethyl-4-(9-phenanthryl) indenyl]}zirconium dichloride, rac-dimethylsilyl-bis[1-(2-n-propyl-4-phenylindenyl)] zirconium dichloride, rac-dimethylsilyl-bis{1-[2-n-propyl-4-(1-naphthyl) indenyl]}zirconium dichloride and rac-dimethylsilyl-bis{1-[2-n-propyl-4-(9-phenanthryl) indenyl]}zirconium dichloride.

Of the compounds, metallocene compounds having bulky substituents, such as rac-dimethylsilyl-bis{1-[2-ethyl-4-(1-naphthyl)indenyl] }zirconium dichloride, rac-dimethylsilyl-bis{1-[2-ethyl-4-(9-phenanthryl) indenyl]}zirconium dichloride, rac-dimethylsilyl-bis{1-[2-n-propyl-4-(1-naphthyl) indenyl]}zirconium dichloride and rac-dimethylsilyl-bis{1-[2-n-propyl-4-(9-phenanthryl) indenyl]}zirconium dichloride, are more preferably employed.

Examples of the metallocene compounds of a chiral structure having C1 symmetry include ethylene[2-methyl-4-(9-phenanthryl)-1-indenyl](9-fluorenyl)zirconium dichloride, ethylene[2-methyl-4-(9-phenanthryl)-1-indenyl](2,7-dimethyl-9-fluorenyl)zirconium dichloride, dimethylsilyl(9-fluorenyl)(3-t-butylcyclopentadienyl) zirconium dichloride and diphenylsilyl(9-fluorenyl)(3-t-butylcyclopentadienyl) zirconium dichloride.

The metallocene compounds mentioned above may be used singly or in combination of two or more kinds, and may be used in combination with the aforesaid solid titanium catalyst component (I).

The metallocene compound is used in combination with the aforesaid organometallic catalyst component (II).

One example of the metallocene catalyst is described below.

The metallocene catalyst is formed from, for example, (a) a transition metal compound of a Group 4 metal of the periodic table, which contains a ligand having a cyclopentadienyl skeleton, (sometimes referred to as "metallocene compound (a)" hereinafter), (b) an organoaluminum oxy-compound, and optionally (c) a particulate carrier.

(a) Metallocene Compound

The metallocene compound (a) is represented by the following formula (1).

$$ML_x \qquad (1)$$

In the above formula, M is a transition metal atom of Group 4 of the periodic table, specifically zirconium, titanium or hafnium.

L is a ligand coordinated to the transition metal atom. At least one of L is a ligand containing a ligand having a cyclopentadienyl skeleton, and L other than the ligand containing a ligand having a cyclopentadienyl skeleton is a hydrocarbon group of 1 to 12 carbon atoms, an alkoxy group, an aryloxy group, a trialkylsilyl group, a $SO_3R$ group (R is a hydrocarbon group of 1 to 8 carbon atoms which may have a substituent such as halogen), a halogen or hydrogen. x is a number satisfying a valence of the transition metal atom.

Examples of the ligands containing a ligand having a cyclopentadienyl skeleton include a cyclopentadienyl group; alkyl-substituted cyclopentadienyl groups, such as a methylcyclopentadienyl group, a dimethylcyclopentadienyl group, a trimethylcyclopentadienyl group, a tetramethylcyclopentadienyl group, a pentamethylcyclopentadienyl group, an ethylcyclopentadienyl group, a methylethylcyclopentadienyl group, a propylcyclopentadienyl group, a methylpropylcyclopentadienyl group, a butylcyclopentadienyl group, a methylbutylcyclopentadienyl group and a hexylcyclopentadienyl group;

an indenyl group; a 4,5,6,7-tetrahydroindenyl group; and a fluorenyl group. These groups may be substituted with a halogen, a trialkylsilyl group or the like.

When the compound of the formula (I) contains two or more groups having a cyclopentadienyl skeleton, two of the groups having a cyclopentadienyl skeleton may be bonded to each other through an alkylene group such as ethylene or propylene, a substituted alkylene group such as isopropylidene or diphenylmethylene, a silylene group, or a substituted silylene group such as dimethylsilylene, diphenylsilylene or methylphenylsilylene.

The ligand L other than the ligand having a cyclopentadienyl skeleton is, for example, as follows. Examples of the hydrocarbon groups of 1 to 12 carbon atoms include alkyl groups, cycloalkyl groups, aryl groups and aralkyl groups.

More specifically, there can be mentioned:
alkyl groups, such as methyl, ethyl, propyl, isopropyl and butyl;
cycloalkyl groups, such as cyclopentyl and cyclohexyl;
aryl groups, such as phenyl and tolyl; and
aralkyl groups, such as benzyl and neophyl.

Examples of the alkoxy groups include methoxy, ethoxy and butoxy.

Examples of the aryloxy groups include phenoxy.

Examples of the halogens include fluorine, chlorine, bromine and iodine.

Examples of the ligands represented by SO$_3$R include a p-toluenesulfonato group, a methanesulfonate group and a trifluoromethanesulfonato group.

When the valence of the transition metal atom is 4, the metallocene compound (a) containing a ligand having a cyclopentadienyl skeleton is more specifically represented by the following formula (2):

$$R^1_a R^2_b R^3_c R^4_d M \quad (2)$$

wherein M is the same transition metal atom as M in the formula (1), R$^1$ is a group (ligand) having a cyclopentadienyl skeleton, R$^2$, R$^3$ and R$^4$ are a group having a cyclopentadienyl skeleton, an alkyl group, a cycloalkyl group, an aryl group, an aralkyl group, an alkoxy group, an aryloxy group, a trialkylsilyl group, a SO$_3$R group, a halogen or hydrogen, a is an integer of 1 or greater, and a+b+c+d=4.

A metallocene compound wherein at least two of R$^1$, R$^2$, R$^3$ and R$^4$ in the formula (2), for example, R$^1$ and R$^2$, are groups (ligands) having a cyclopentadienyl skeleton is preferably employed.

When the metallocene compound has two or more group shaving a cyclopentadienyl skeleton, two of the groups having a cyclopentadienyl skeleton may be bonded through an alkylene group such as ethylene or propylene, a substituted alkylene group such as isopropylidene or diphenylmethylene, a silylene group, or a substituted silylene group such as dimethylsilylene, diphenylsilylene or methylphenylsilylene.

R$^3$ and R$^4$ are a group having a cyclopentadienyl skeleton, an alkyl group, a cycloalkyl group, an aryl group, an aralkyl group, analkoxy group, an aryloxy group, a trialkylsilyl group, a SO$_3$R group, a halogen or hydrogen.

Examples of the metallocene compounds wherein M is zirconium include bis(indenyl)zirconium dichloride,
bis(indenyl)zirconium dibromide,
bis(indenyl)zirconiumbis(p-toluenesulfonato)bis(4,5,6,7-tetrahydroindenyl)zirconium dichloride,
bis(fluorenyl)zirconium dichloride,
ethylenebis(indenyl)zirconium dichloride,
ethylenebis(indenyl)zirconium dibromide,
ethylenebis(indenyl)dimethylzirconium,
ethylenebis(indenyl)diphenylzirconium,
ethylenebis(indenyl)methylzirconium monochloride,
ethylenebis(indenyl)zirconiumbis(methanesulfonato),
ethylenebis(indenyl)zirconiumbis(p-toluenesulfonato),
ethylenebis(indenyl)zirconiumbis(trifluoromethanesulfonato),
ethylenebis(4,5,6,7-tetrahydroindenyl)zirconium dichloride,
isopropylidene(cyclopentadienyl-fluorenyl)zirconium dichloride,
isopropylidene(cyclopentadienyl-methylcyclopentadienyl)zirconium dichloride,
dimethylsilylenebis(cyclopentadienyl)zirconium dichloride,
dimethylsilylenebis(methylcyclopentadienyl)zirconium dichloride,
dimethylsilylenebis(dimethylcyclopentadienyl)zirconium dichloride,
dimethylsilylenebis(trimethylcyclopentadienyl)zirconium dichloride, dimethylsilylenebis(indenyl)zirconium dichloride, dimethylsilylenebis(indenyl)zirconiumbis(trifluoromethanesulfonato),
dimethylsilylenebis(4,5,6,7-tetrahydroindenyl)zirconium dichloride,
dimethylsilylene(cyclopentadienyl-fluorenyl)zirconium dichloride, diphenylsilylenebis(indenyl)zirconium dichloride, methylphenylsilylenebis(indenyl)zirconium dichloride, bis(cyclopentadienyl)zirconium dichloride,
bis(cyclopentadienyl)zirconium dibromide,
bis(cyclopentadienyl)methylzirconium monochloride,
bis(cyclopentadienyl)ethylzirconium monochloride,
bis(cyclopentadienyl)cyclohexylzirconium monochloride,
bis(cyclopentadienyl)phenylzirconium monochloride,
bis(cyclopentadienyl)benzylzirconium monochloride,
bis(cyclopentadienyl)zirconium monochloride monohydride,
bis(cyclopentadienyl)methylzirconium monohydride,
bis(cyclopentadienyl)dimethylzirconium,
bis(cyclopentadienyl)diphenylzirconium,
bis(cyclopentadienyl)dibenzylzirconium,
bis(cyclopentadienyl)zirconium methoxychloride,
bis(cyclopentadienyl)zirconium ethoxychloride,
bis(cyclopentadienyl)zirconiumbis(methanesulfonato),
bis(cyclopentadienyl)zirconiumbis(p-toluenesulfonato),
bis(cyclopentadienyl)zirconiumbis(trifluoromethanesulfonato),
bis(methylcyclopentadienyl)zirconium dichloride,
bis(dimethylcyclopentadienyl)zirconium dichloride,
bis(dimethylcyclopentadienyl)zirconium ethoxychloride,
bis(dimethylcyclopentadienyl)zirconiumbis(trifluoromethanesulfonato),
bis(ethylcyclopentadienyl)zirconium dichloride,
bis(methylethylcyclopentadienyl)zirconium dichloride,
bis(propylcyclopentadienyl)zirconium dichloride,
bis(methylpropylcyclopentadienyl)zirconium dichloride,
bis(butylcyclopentadienyl)zirconium dichloride,
bis(methylbutylcyclopentadienyl)zirconium dichloride,
bis(methylbutylcyclopentadienyl)zirconiumbis(methanesulfonato),
bis(trimethylcyclopentadienyl)zirconium dichloride,
bis(tetramethylcyclopentadienyl)zirconium dichloride,
bis(pentamethylcyclopentadienyl)zirconium dichioride,
bis(hexylcyclopentadienyl)zirconium dichloride and
bis(trimethylsilylcyclopentadienyl)zirconium dichloride.

In the above examples, the di-substitution products of cyclopentadienyl rings include 1,2- and 1,3-substitution products, and the tri-substitution products of cyclopentadienyl rings include 1,2,3- and 1,2,4-substitution products. The alkyl groups such as propyl and butyl include isomers such as n-, iso-, sec- and tert-groups.

Compounds wherein zirconium is replaced with titanium or hafnium in the above-mentioned zirconium compounds are also employable as the metallocene compounds (a).

These compounds may be used singly or in combination of two or more kinds. These compounds may be used, diluting with a hydrocarbon or a halogenated hydrocarbon.

As the metallocene compound (a), a zirconocene compound having zirconium as the central metal atom and having at least two ligands containing a cyclopentadienyl skeleton is preferably employed.

(b) Organoaluminum Oxy-compound

The organoaluminum oxy-compound (b) is, for example, a hitherto known aluminoxane or a benzene-insoluble aluminum oxy-compound as disclosed in Japanese Patent Laid-Open Publication No. 276807/1990.

The hitherto known aluminoxane can be prepared from the later-described organoaluminum compound (b-2) by, for example, the following processes.

(1) An organoaluminum compound such as trialkylaluminum is added to a hydrocarbon medium suspension of a compound containing adsorption water or a salt containing water of crystallization, e.g., magnesium chloride hydrate, copper sulfate hydrate, aluminum sulfate hydrate, nickel sulfate hydrate or cerous chloride hydrate, to perform reaction, and the aluminoxane is recovered as a solution in the hydrocarbon.

(2) Water (water, ice or water vapor) is allowed to directly act on an organoaluminum compound such as trialkylaluminum in a medium such as benzene, toluene, ethyl ether or tetrahydrofuran, and the aluminoxane is recovered as a solution in the above medium.

(3) An organotin oxide such as dimethyltin oxide or dibutyltin oxide is allowed to react with an organoaluminum compound such as trialkylaluminum in a medium such as decane, benzene or toluene.

It is possible that the solvent or the unreacted organoaluminum compound is removed from the recovered solution of aluminoxane by distillation and the remainder is redissolved in a solvent.

The organoaluminum oxy-compound (b) may contain a small amount of a metallic component other than aluminum.

(c) Particulate Carrier

Examples of the particulate carriers (c) optionally used include inorganic carriers, such as $SiO_2$, $Al_2O_3$, $B_2O_3$, MgO, $ZrO_2$, CaO, $TiO_2$, ZnO, $Zn_2O$, $SnO_2$, BaO and ThO; and resins (organic carriers), such as polyethylene, polypropylene, poly-1-butene, poly-4-methyl-1-pentene and a styrene/divinylbenzene copolymer. Of these, $SiO_2$ is preferable. These carriers can be used in combination of two or more kinds.

Preparation of Metallocene Catalyst

When the metallocene catalyst is a solid metallocene catalyst consisting essentially of the metallocene compound (a), the organoaluminum oxy-compound (b) and the particulate carrier (c), this solid metallocene catalyst is formed by supporting the metallocene compound (a) and the organoaluminum oxy-compound (b) on the particulate carrier (c) in accordance with a hitherto known method.

The solid metallocene catalyst maybe formed by supporting the later-described organoaluminum compound (b-2) together with the metallocene compound (a) and the organoaluminum oxy-compound (h) on the particulate carrier.

In the preparation of the solid metallocene catalyst, the metallocene compound (a) is used in an amount in terms of a transition metal atom of usually 0.001 to 1.0 mmol, preferably 0.01 to 0.5 mmol, based on 1 g of the particulate carrier (c), and the organoaluminum oxy-compound (b) is used in an amount of usually 0.1 to 100 mmol, preferably 0.5 to 20 mmol.

The solid metallocene catalyst has a particle diameter of usually 1 to 300 μm, preferably 10 to 100 μm.

The solid metallocene catalyst may contain, if necessary, other components useful for the olefin polymerization, such as an electron donor and a reaction assistant, together with the above-mentioned catalyst components.

The solid metallocene catalyst for use in the invention may be a prepolymerized catalyst obtained by prepolymerizing an olefin onto the solid metallocene catalyst.

When the olefin polymerization is carried out using the metallocene catalyst, the following organoaluminum compound (b-2) can be used together with the metallocene catalyst.

(b-2) Organoaluminum Compound

Examples of the organoaluminum compounds (b-2), which are used as the organoaluminum compounds (b-2) for the olefin polymerization and used for preparing the aforesaid solution of the organoaluminum oxy-compound (b), include:

trialkylaluminums, such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum, tridecylaluminum, tricyclohexylaluminum and tricyclooctylaluminum;

dialkylaluminum halides, such as dimethylaluminum chloride, diethylaluminum chloride, diethylaluminum bromide and diisobutylaluminum chloride;

dialkylaluminum hydrides, such as diethylaluminum hydride and diisobutylaluminum hydride;

dialkylaluminum alkoxides, such as dimethylaluminum methoxide and diethylaluminum ethoxide; and dialkylaluminum aryloxides, such as diethylaluminum phenoxide.

Of these, trialkylaluminums are preferable, and triethylaluminum and triisobutylaluminum are particularly preferable.

Also employable as the organoaluminum compound is isoprenylaluminum represented by the following formula:

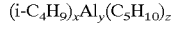

$(i\text{-}C_4H_9)_xAl_y(C_5H_{10})_z$ wherein x, y and z are positive integers, and $z \geq 2x$.

These organoaluminum compounds may be used in combination of two or more kinds.

The organoaluminum compound (b-2) may contain a small amount of a metallic component other than aluminum.

When the organoaluminum compound (b-2) is supported on the particulate carrier (c) together with the metallocene compound (a) and the organoaluminum oxy-compound (b), the organoaluminum compound (b-2) is used in an amount of usually 1 to 300 mol, preferably 2 to 200 mol, based on 1 mol (in terms of a transition metal atom) of the solid metallocene catalyst.

Preparation of Unmodified Polyolefin

In the present invention, an olefin of 2 to 20 carbon atoms is polymerized or copolymerized in the presence of the catalyst mentioned above to prepare an unmodified polyolefin.

Examples of the olefins of 2 to 20 carbon atoms preferably used include ethylene, propylene, 1-butene, 3-methyl-1-butene, 3-methyl-1-pentene and 4-methyl-1-pentene. These monomers may be used singly or in combination of two or more kinds, or may be copolymerized with polymerizable monomers such as dienes other than olefins.

When the monomers are used singly, propylene is particularly preferable When the monomers are used in combination of two or more kinds, combinations of ethylene and propylene; ethylene and butene; ethylene and octane; ethylene, propylene and butene; and ethylene, propylene and diene are preferable.

The olefin polymerization can be carried out by any of liquid phase polymerization, such as solution polymerization and suspension polymerization, and gas phase polymerization. As the polymerization reaction type, suspension polymerization is preferably adopted. As the reaction solvent for the suspension polymerization, an inert hydrocarbon solvent may be used, or an olefin that is liquid at the reaction temperature may be used.

Examples of the inert hydrocarbon media employable in the suspension polymerization include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride and chlorobenzene; and combinations of these hydrocarbons. Of these, aliphatic hydrocarbons are particularly preferably employed.

When the unmodified polyolefin is prepared by the use of the magnesium-supported titanium catalyst system as a catalyst, the solid titanium catalyst component (I) or its prepolymerized catalyst is used in an amount of usually about 0.001 to 100 mmol, preferably about 0.005 to 20 mmol, in terms of titanium atom, based on 1 liter of the polymerization volume. The organometallic compound catalyst component (II) is used in an amount of the metal atom in the catalyst component (II) of usually about 1 to 2000 mol, preferably about 2 to 500 mol, based on 1 mol of the titanium atom in the solid titanium catalyst component (I) in the polymerization system. The electron donor (III) is used in an amount of usually 0.001 to 10 mol, preferably 0.01 to 5 mol, based on 1 mol of the metal atom in the organometallic compound catalyst component (II).

In the polymerization process, the amount of hydrogen is in the range of usually 0 to 0.25 mol, preferably 0 to 0.20 mol, more preferably 0 to 0.15 mol, based on 1 mol of the monomer.

When the magnesium-supported titanium catalyst system is used, the polymerization temperature is in the range of usually about 20 to 300° C., preferably about 50 to 150° C., and the polymerization pressure is in the range of 0.01 to 10 MPa, preferably 0.05 to 5 MPa.

When the unmodified polyolefin is prepared by the use of the metallocene catalyst as a catalyst, the amount of the metallocene compound (a) used in the polymerization system is in the range of usually 0.00005 to 0.1 mmol, preferably 0.0001 to 0.05 mmol, based on 1 liter of the polymerization volume. The organoaluminum oxy-compound (b) is used in such an amount that the molar ratio (Al/M) of the aluminum atom (Al) to the transition metal atom (M) in the metallocene compound (a) becomes 5 to 1000, preferably 10 to 400. If the organoaluminum compound (b-2) is used, the organoaluminum compound (b-2) is used in an amount of usually about 1 to 300 mol, preferably about 2 to 200 mol, based on 1 mol of the transition metal atom in the metallocene compound (a).

When the metallocene catalyst is used, the polymerization temperature is in the range of usually −20 to 150° C., preferably 0 to 120° C., more preferably 0 to 100° C., and the polymerization pressure is higher than 0 MPa and not higher than 8 MPa, preferably higher than 0 MPa and not higher than 5 MPa.

The olefin polymerization can be carried out by any of batchwise, semi-continuous and continuous processes. The polymerization can be carried out in two or more steps under different reaction conditions. In the olefin polymerization, a homopolymer of an olefin may be prepared, or a random copolymer may be prepared from two or more kinds of olefins.

For preparing a branched polyolefin wherein the composition of the olefin chain (A) is the same as that of the olefin chain (B), the unmodified polyolefin to be prepared in the olefin polymerization is preferably polypropylene, and this polypropylene desirably has a density of 0.880 to 0.960 g/cm$^3$, particularly 0.890 to 0.950 g/cm$^3$, and MFR of 0.05 to 1,000 g/10 min, particularly 0.1 to 500 g/10 min. When the polypropylene is a copolymer, the amount of the copolymerized component is desired to be usually not more than 10% by mol, particularly not more than 5% by mol.

For preparing a branched polyolefin wherein the composition of the olefin chain (A) is different from that of the olefin chain (B), the unmodified polyolefin to be prepared in the olefin polymerization is preferably a copolymer of ethylene and an olefin of 3 to 20 carbon atoms, and this copolymer has a density of 0.850 to 0.900 g/cm$^3$, preferably 0.858 to 0.898 g/cm$^3$, more preferably 0.855 to 0.895 g/cm$^3$, MFR of 0.1 to 50 g/10 min, preferably 0.2 to 40 g/10 min, more preferably 0.3 to 30 g/10 min, and a crystallinity, as measured by X-rays, of less than 30%, preferably less than 28%, more preferably less than 25%.

Modification of Unmodified Polyolefin

The functional group-containing polyolefin is obtained by graft modifying a part or the whole of the unmodified polyolefin with a graft monomer selected from unsaturated carboxylic acids and their derivatives.

Examples of the unsaturated carboxylic acids and their derivatives employable in the graft modification include unsaturated carboxylic acids, such as acrylic acid, maleic acid, fumaric acid, tetrahydrophthalic acid, itaconic acid, citraconic acid, crotonic acid, isocrotonic acid and nadic acid™ (endocis-bicyclo[2,2,1]hept-5-ene-2,3-dicarboxylic acid); and their derivatives, such as acid halides, amides, imides, anhydrides and esters, specifically, malenyl chloride, maleimide, maleic anhydride, citraconic anhydride, monomethyl maleate, dimethyl maleate and glycidyl maleate. Of these, preferable are unsaturated carboxylic acids and anhydrides of these acids, and particularly preferable are maleic acid, nadic acid™, himic acid and anhydrides of these acids. In order to prepare the functional group-containing polyolefin through graft copolymerization of the unmodified polyolefin with a graft monomer selected from the unsaturated carboxylic acids and their derivatives, various processes hitherto known are adoptable.

For example, there are a process comprising melting the unmodified polyolefin and adding a graft monomer to perform graft copolymerization, and a process comprising dissolving the unmodified polyolefin in a solvent and adding a graft monomer to perform graft copolymerization. In either process, it is preferable to carry out the reaction in the presence of a radical initiator in order to efficiently graft copolymerize the graft monomer.

The graft copolymerization is carried out at a temperature of usually 60 to 350° C. The radical initiator is used in an amount of usually 0.001 to 1 part by weight based on 100 parts by weight of the unmodified polyolefin.

Examples of the radical initiators employable herein include organic peroxides and organic peresters. Specifically, there can be mentioned benzoyl peroxide, dichlorobenzoyl peroxide, dicumyl peroxide, di-tert-butyl peroxide, 2,5-dimethyl-2,5-di(peroxybenzoate)hexyne-3, 1,4-bis(tert-butylperoxyisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane, tert-butyl perbenzoate, tert-butylperphenyl acetate, tert-butyl perisobutyrate, tert-butyl per-sec-octoate, tert-butyl perpivalate, cumyl perpivalate and tert-butylperdiethyl acetate. Also employable are azo compounds, such as azobisisobutyronitrile and dimethyl azoisobutyrate. Of these, preferable are dialkyl peroxides, such as dicumyl peroxide, di-tert-butyl peroxide, 2,5-dimethyl-2,5-di(tert-butylperoxy)hexyne-3, 2,5-dimethyl-2,5-di(tert-butylperoxy)hexane and 1,4-bis(tert-butylperoxyisopropyl)benzene.

In the functional group-containing polyolefin (C) obtained above, the graft quantity of the unsaturated carboxylic acid or its derivative is in the range of 0.05 to 15% by weight, preferably 0.08 to 13% by weight, more preferably 0.1 to 10% by weight, based on the amount of the unmodified polyolefin.

When the functional group-containing polyolefin (C) is a polyolefin obtained by modifying an ethylene (co)polymer, this polyolefin desirably has MFR of usually 0.001 to 1,000 g/10 min, preferably 0.005 to 500 g/10 mm, more preferably 0.01 to 100 g/10 mm, and a density of usually 0.70 to 1.0 g/cm$^3$, preferably 0.75 to 0.98 g/cm$^3$, more preferably 0.80 to 0.96 g/cm$^3$. This functional group-containing polyolefin (C) is preferably used for the preparation of a branched polyolefin wherein the composition of the olefin chain (A) is different from that of the olefin chain (B).

When the functional group-containing polyolefin (C) is a polyolefin obtained by modifying a propylene (co)polymer, this polyolefin desirably has MFR of usually 0.05 to 1,000 g/10 min, preferably 0.1 to 500 g/10 min, more preferably 0.2 to 300 g/10 min, and a density of usually 0.880 to 0.960 g/cm$^3$, preferably 0.890 to 0.950 g/cm$^3$, more preferably 0.900 to 0.940 g/cm$^3$. This functional group-containing polyolefin (C) is preferably used for the preparation of a branched polyolefin wherein the composition of the olefin chain (A) is the same as that of the olefin chain (B).

(D) Terminal Modified Polyolefin

The terminal modified polyolefin (D) is a polyolefin having an olefin composition which is the same as or different from that of the functional group-containing olefin polymer (C) and containing at least one group capable of reacting with a carboxyl group or an acid anhydride group at only the position of chain end. The terminal modified polyolefin is preferably a polyolefin having a group capable of reacting with a carboxyl group or an acid anhydride group at only one-side-end. The terminal modified polyolefin (D) becomes the olefin chain (B), and the group capable of reacting with a carboxyl group or an acid anhydride group becomes a bond having a carbonyl group for linking the olefin chain (A) to the olefin chain (B).

Examples of the groups capable of reacting with a carboxyl group or an acid anhydride group include a hydroxyl group, an alkoxy group, an amino group, an imino group and a halogen. Of these, a hydroxyl group and an amino group are preferable.

The terminal modified polyolefin (D) can be prepared by, for example, a process comprising preparing a polyolefin having a Group 13 element-containing group represented by —AlR$^1$R$^2$ at an end (said polyolefin being sometimes referred to as a "Group 13 element containing group-containing polyolefin" hereinafter), and then conducting substitution reaction of the Group 13 element-containing group of the Group 13 element containing group-containing polyolefin with a compound having a functional group structure, or conducting reaction of the Group 13 element-containing group of the Group 13 element containing group-containing polyolefin with a compound having a structure that forms a functional group by solvolysis, followed by conducting solvolysis. The resulting terminal functional group may be converted into another functional group through the later-described reaction.

The terminal modified polyolefin (D) can be prepared by polymerizing or copolymerizing an olefin of 2 to 20 carbon atoms using, for example, the above-mentioned magnesium-supported titanium catalyst system or metallocene catalyst.

Examples of the olefins of 2 to 20 carbon atoms preferably used include ethylene, propylene, 1-butene, 3-methyl-1-butene, 3-methyl-1-pentene and 4-methyl-1-pentene. Of these, ethylene and/or propylene are more preferably employed, and propylene is most preferably employed.

When the magnesium-supported titanium catalyst system is used, the solid titanium catalyst component (I) or its prepolymerized catalyst is used in the polymerization system in an amount of usually about 0.0001 to 50 mmol, preferably about 0.001 to 10 mmol, in terms of the titanium atom, based on 1 liter of the polymerization volume. The organometallic compound catalyst component (II) is used in an amount of the metal atom in the catalyst component (II) of usually 1 to 2000 mol, preferably 2 to 1000 mol, based on 1 mol of the titanium atom in the solid titanium catalyst component (I) in the polymerization system. If the electron donor (III) is used, this electron donor (III) is used in an amount of usually 0.001 to 10 mol, preferably 0.01 to 5 mol, based on 1 mol of the metal atom in the organometallic compound catalyst component (II).

When the metallocene catalyst is used as a catalyst for polymerization, the amount of the metallocene compound (a) in the polymerization system is in the range of usually 0.00005 to 0.1 mmol, preferably 0.0001 to 0.05 mmol, based on 1 liter of the polymerization volume. If the organoaluminum oxy-compound (b) is used, this compound (b) is used in such an amount that the molar ratio (Al/M) of the aluminum atom (Al) to the transition metal atom (m) in the metallocene compound (a) becomes 5 to 1000, preferably 10 to 400. If the organoaluminum compound (b-2) is used, this compound (b-2) is used in an amount of usually about 1 to 300 mol, preferably about 2 to 200 mol, based on 1 mol of the transition metal atom in the metallocene compound (a).

The olefin polymerization can be carried out by any of liquid phase polymerization, such as solution polymerization and suspension polymerization, and gas phase polymerization. As the reaction solvent for the suspension polymerization, the aforesaid inert hydrocarbon solvent may be used, or an olefin that is liquid at the reaction temperature may be used. The reaction temperature is in the range of usually −50 to 200° C., preferably 0 to 150° C., and the polymerization pressure is in the range of usually 0.01 to 10 MPa, preferably 0.1 to 5 MPa. The olefin polymerization can be carried out by any of batchwise, semi-continuous and continuous processes. When the olefin polymerization is conducted in two or more steps, the reaction conditions may be the same or different.

It is preferable that molecular hydrogen that is a general molecular weight modifier is not present in the olefin polymerization, and regulation of the molecular weight is preferably carried out by controlling one or more conditions selected from the concentration of the organometallic catalyst component (II), the polymerization temperature and the concentration (polymerization pressure) of the olefin. The molecular weight is specifically regulated as follows. For example, in the suspension polymerization wherein molecular hydrogen is not present substantially, the concentration of the organometallic catalyst component (II) is increased, whereby the molecular weight of the resulting polyolefin can be decreased, or in the suspension polymerization wherein molecular hydrogen is not present substantially, the polymerization temperature is increased, whereby the molecular weight of the resulting polyolefin can be decreased.

The polyolefin obtained as above has a Group 13 element-containing group and/or an unsaturated bond at an end, preferably at only one-side-end. Whether the end of the polyolefin is a Group 13 element-containing group or an unsaturated bond depends upon the polymerization conditions, such as the type of the catalyst used, the type and/or the amount of the organometallic catalyst component, and the polymerization temperature.

When the end of the polyolefin is an unsaturated bond, the unsaturated bond can be converted into a Group 13 element-containing group through the reaction with the compound containing the Group 13 element. For preparing a polyolefin having the unsaturated bond at an end, the aforesaid process using the metallocene catalyst is preferable. Further, the polyolefin having the unsaturated bond(s) at end(s) can be prepared also by thermally decomposing a polyolefin having neither a Group 13 element-containing group nor an unsaturated bond at an end that is prepared by a conventional process, and the resulting polyolefin can be preferably employed. Also when the resulting polyolefin is a mixture of a polyolefin wherein a Group 13 element is bonded to an end and a polyolefin having an unsaturated bond at an end, the terminal unsaturated bond of the polyolefin may be converted into an end to which a Group 13 element is bonded if necessary.

The compound containing a Group 13 element, which is used for the reaction, is selected from the aforesaid compounds exemplified as the organometallic compound catalyst components (II). Of such compounds, those exemplified as the organoaluminum compounds or the organoboron compounds are preferably employed. Of these, trialkylaluminum, dialkylaluminum hydride or a boron compound having one or more hydrogen-boron bonds is more preferable.

The reaction of the polyolefin having unsaturated bond(s) at end(s) with the compound containing Group 13 element (s) is carried out by, for example, the following processes.

(1) Polypropylene having a vinylidene group at an end, in an amount of 0.1 to 50 g, is mixed with 5 to 1000 ml of an octane solution of diisobutylaluminum hydride having a concentration of 0.01 to 5 mol/l, and the mixture was refluxed for 0.5 to 6 hours.

(2) Polypropylene having a vinylidene group at an end, in an amount of 0.1 to 50 g, is mixed with 5 to 1000 ml of anhydrous tetrahydrofuran and 0.1 to 50 ml of a tetrahydrofuran solution of 9-borabicyclo[3.3.1]nonane having a concentration of 0.05 to 10 mol/l, and the mixture is stirred at 20 to 65° C. for 0.5 to 24 hours.

Through the above processes, a terminal modified polyolefin is prepared. To the end of the resulting polyolefin, preferably to only one-side-end thereof, a Group 13 element is bonded, and the Group 13 element is preferably aluminum.

The Group 13 element containing group-containing polyolefin prepared above is usually obtained as a slurry.

Subsequently, (1) a substitution reaction of the Group 13 element-containing group of the Group 13 element containing group-containing polyolefin with a compound having a functional group structure is carried out, or (2) a reaction of the Group 13 element-containing group of the Group 13 element containing group-containing polyolefin with a compound having a structure that forms a functional group by solvolysis is carried out, followed by solvolysis. Thus, a terminal modified polyolefin is prepared. The resulting terminal functional group may be converted into another functional group through the later-described reaction.

Examples of the compounds having a functional group structure include a halogen, methyl chloroformate and phthaloyl chloride.

Examples of the compounds having a structure that forms a functional group by solvolysis include oxygen, carbon monoxide and carbon dioxide.

The substitution reaction of the Group 13 element-containing group of the Group 13 element containing group-containing polyolefin with the compound having a functional group structure or the compound having a structure that forms a functional group by solvolysis is carried out at a temperature of usually 0 to 300° C., preferably 10 to 200° C., for 0 to 100 hours, preferably 0.5 to 50 hours.

The temperature for the solvolysis is in the range of usually 0 to 100° C., preferably 10 to 80° C., and the solvolysis time is in the range of 0 to 100 hours, preferably 0.5 to 50 hours.

Examples of solvents used for the solvolysis include methanol, ethanol, propanol, butanol and water.

The group with which the end is modified is a group capable of reacting with a carboxyl group or an acid anhydride group. Examples of such groups include a hydroxyl group, an alkoxy group, an amino group, an imino group and a halogen. Of these, particularly preferable is a hydroxyl group, an amino group or a halogen.

Examples of conversions of the end of the Group 13 element containing group-containing polyolefin having —AlR$^1$R$^2$ group at an end into a hydroxyl group, a halogen or an amino group are given below.

(1) Conversion into Hydroxyl Group

After contact with dried air, a large excess of methanol containing a small amount of hydrochloric acid is added to a —AlR$^1$R$^2$ group-containing polyolefin, followed by stirring for 5 minutes to 12 hours.

(2) Conversion into Halogen

To the polymer obtained by the above process (1), thionyl chloride of 1 to 10 times mol as much as the hydroxyl group is added, followed by the reaction at 0 to 100° C. for 5 minutes to 24 hours. Instead of thionyl chloride, thionyl bromide is employable.

(3) Conversion into Amino Group.

To the polymer obtained by the above process (2), sodium azide of 1 to 10 times mol as much as the halogen is added, followed by the reaction at 50 to 150° C. for 0.5 to 24 hours. To the resulting reaction product, triphenylphosphine of 1 to 10 times mol as much as the sodium azide is added, followed by the reaction at 0 to 100° C. for 0.5 to 24 hours.

Similarly to the polyolefin having a Group 13 element-containing group at an end, a polyolefin having a group containing an element other than a Group 13 element at an end is also employable. The polyolefin having a group containing an element other than a Group 13 element at an end is prepared by living polymerization or chain transfer reaction hitherto known. In particular, a polyolefin having a group containing an element of 3, 4, 5 or 10 Group at an end, which is prepared by living polymerization, or a polyolefin having a group containing a Group 12 element or silicon (Si) at an end, which is prepared by chain transfer reaction, is preferable.

The terminal modified polyolefin (D) obtained as above has MFR of usually 0.01 to 5,000 g/10 min, preferably 0.05 to 3,000 g/10 min, more preferably 0.1 to 1,500 g/10 min, and a density of usually 0.7 to 1.0 g/cm$^3$, preferably 0.75 to 0.98 g/cm$^3$, more preferably 0.80 to 0.96 g/cm$^3$. The weight-average molecular weight (Mw) of the polyolefin is desired to be in the range of usually not less than 5,000, preferably 5,000 to 1,000,000, more preferably 10,000 to 500,000.

When the branched polyolefin wherein the composition of the olefin chain (A) is the same as that of the olefin chain (B) is prepared, the terminal modified polyolefin (D) desirably has MFR of usually 0.01 to 3,000 g/10 min, preferably 0.05 to 1,000 g/10 min, more preferably 0.1 to 500 g/10 min, and a density of usually 0.880 to 0.960 g/cm$^3$, preferably 0.890 to 0.950 g/cm$^3$, more preferably 0.900 to 0.940 g/cm$^3$.

When the branched polyolefin wherein the composition of the olefin chain (A) is different from that of the olefin chain (B) is prepared, the terminal modified polyolefin (D) is preferably polypropylene, and in this case, this polypropylene preferably has a density of usually 0.890 to 0.920 g/cm$^3$, particularly 0.900 to 0.915 g/cm$^3$, and MFR of 0.05 to 1,000 g/10 min, particularly 0.1 to 500 g/10 min. When the polypropylene is a copolymer, the content of the copolymerized component is desired to be usually not more than 10% by mol, particularly not more than 5% by mol.

Preparation of Branched Polyolefin

The reaction of the functional group-containing polyolefin (C) with the terminal modified polyolefin (D) is carried out by, for example, contacting the functional group-containing polyolefin (C) with the terminal modified polyolefin (D) under stirring. In this case, it is preferable that the contact is performed in a state where the functional group-containing polyolefin (C) and the terminal modified polyolefin (D) are molten or in a state where at least a part of the functional group-containing polyolefin (C) and at least a part of the terminal modified polyolefin (D) are dissolved in an organic solvent, and it is more preferable that the contact is performed in a state where the functional group-containing polyolefin (C) and the terminal modified polyolefin (D) are completely dissolved in an organic solvent.

Examples of the organic solvents employable include aliphatic hydrocarbons, such as hexane, heptane and decane; aromatic hydrocarbons, such as benzene, toluene and xylene; halogen-containing hydrocarbons, such as methylene chloride and dichlorobenzene; and hetero atom-containing hydrocarbons, such as dimethyl sulfoxide and dimethylformamide.

This reaction is carried out at a temperature of usually 20 to 250° C., preferably 40 to 200° C., for 1 minute to 24 hours, preferably 5 minutes to 12 hours.

Thermoplastic Resin Composition

The thermoplastic resin composition of the invention comprises the branched polyolefin and a thermoplastic resin other than the branched polyolefin, and contains the branched polyolefin in a content of 0.01 to 50% by weight, preferably 0.1 to 30% by weight, more preferably 1 to 25% by weight.

Thermoplastic Resin

As the thermoplastic resin, at least one thermoplastic resin selected from polyolefin, polyamide, polyester, polyacetal, polystyrene, an acrylonitrile/butadiene/styrene copolymer (ABS), polymethacrylate, polycarbonate, polyphenylene oxide, polyvinyl chloride, polyvinylidene chloride, polyvinyl acetate, an ethylene/(meth)acrylic ester copolymer and a diene rubber is preferably used in the invention.

Examples of the polyolefins include olefin homopolymers other than the branched polyolefin, such as polyethylene, polypropylene, poly-1-butene, polymethylpentene and polymethylbutene; and olefin copolymers, such as an ethylene/α-olefin random copolymer, an ethylene/propylene/diene terpolymer, a propylene/ethylene random copolymer, a propylene/α-olefin random copolymer and a propylene/ethylene/α-olefin terpolymer. Of these, polyethylene, polypropylene, an ethylene/α-olefin random copolymer, an ethylene/propylene/diene terpolymer, a propylene/ethylene random copolymer and a propylene/α-olefin random copolymer are preferable. When the polyolefin is a polyolefin obtained from an olefin of 3 or more carbon atoms, this polyolefin may be an isotactic polymer or may be a syndiotactic polymer.

As the catalyst for the preparation of the polyolefin, any catalyst publicly known, such as a Ziegler-Natta catalyst or a metallocene catalyst, may be used.

Examples of the polyamides include aliphatic polyamides, such as nylon-6, nylon-66, nylon-10, nylon-12 and nylon-46, and aromatic polyamides prepared from aromatic dicarboxylic acids and aliphatic diamines. Of these, nylon-6 is preferable.

Examples of the polyesters include aromatic polyesters, such as polyethylene terephthalate, polyethylene naphthalate and polybutylene terephthalate, polycaprolactone, and polyhydroxy butyrate. Of these, polyethylene terephthalate is preferable.

Examples of the polyacetals include polyformaldehyde (polyoxymethylene), polyacetaldehyde, polypropionaldehyde and polybutylaldehyde. Of these, polyformaldehyde is particularly preferable.

The polystyrene may be a homopolymer of styrene, or may be a bipolymer of styrene and acrylonitrile, methyl methacrylate, α-methylstyrene or the like, such as an acrylonitrile/styrene copolymer.

As the ABS, one containing constituent units derived from acrylonitrile in a content of 20 to 35% by mol, constituent units derived from butadiene in a content of 20 to 30% by mol and constituent units derived from styrene in a content of 40 to 60% by mol is preferably employed.

As the polymethacrylate, polymethyl methacrylate (PMMA) is preferable.

Examples of the polycarbonates include those obtained from bis(4-hydroxypheny)methane, 1,1-bis(4-hydroxyphenyl)ethane, 2,2-bis(4-hydroxyphenyl)propane and 2,2-bis(4-hydroxyphenyl)butane. Of these, polycarbonate obtained from 2,2-bis(4-hydroxyphenyl)propane is preferable.

As the polyphenylene oxide, poly(2,6-dimethyl-1,4-phenylene oxide) is preferable.

The polyvinyl chloride may be a homopolymer of vinyl chloride, or may be a copolymer of vinyl chloride and vinylidene chloride, acrylic ester, acrylonitrile, propylene or the like.

As the polyvinylidene chloride, a copolymer of vinylidene chloride and vinyl chloride, acrylonitrile, (meth) acrylic ester, allyl ester, unsaturated ether, styrene or the like, which contains vinylidene chloride units in a content of not less than 85%, is usually employed.

The polyvinyl acetate may be a homopolymer of vinyl acetate, or may be a copolymer of vinyl acetate and ethylene or vinyl chloride. Of these, preferable is an ethylene/vinyl acetate copolymer As the ethylene/(meth)acrylic ester copolymer, an ethylene/methyl acrylate copolymer, an ethylene/ethyl acrylate copolymer, an ethylene/methyl methacrylate copolymer or an ethylene/ethyl methacrylate copolymer is preferable.

Examples of the diene rubbers include conjugated polydienes, such as polybutadiene, polyisoprene and a styrene/butadiene copolymer of elastomer type that is known as SBR (styrene-butadiene rubber). In these diene rubbers, a part of double bonds in the molecules may be hydrogenated.

The thermoplastic resins mentioned above can be used singly or in combination of two or more kinds.

Of the above thermoplastic resins, preferably used is a polyolefin, a polyester, a polyamide or a polystyrene, and more preferably used is a polyolefin. Especially when a polyolefin that is a copolymer having different compositions is used or when two or more kinds of polyolefins are used in combination, the branched polyolefin is most preferably used as a compatibilizing agent.

The thermoplastic resin composition of the invention is prepared for the main purpose of allowing the composition to function as an improver of melt properties of the branched polyolefin and/or a compatibilizing agent for a copolymer having different compositions or two or more kinds of polyolefins.

More specifically, effects of improvement in melt properties, such as increase of melt tension or swell ratio, and/or effects of compatibilization such that domain size is reduced in the phase structure can be expected.

Additives

The thermoplastic resin composition of the invention may contain additives, such as inorganic filler, organic filler, crystal-nucleating agent, hest stabilizer, weathering stabilizer, antistatic agent, colorant, lubricant, flame retardant and anti-blooming agent, within limits not detrimental to the objects of the invention.

Preparation

The thermoplastic resin composition of the invention can be prepared by blending the branched polyolefin with the thermoplastic resin by means of, for example, a ribbon blender, a tumbling blender or a Henschel blender.

The thermoplastic resin composition of the invention can be prepared also by melt kneading the branched polyolefin with the thermoplastic resin using a kneading machine such as a Ko-kneader, a Banbury mixer, a Brabender, a single-screw extruder or a twin-screw extruder, a horizontal stirring machine such as a twin-screw stirring machine with surface renewal action or a twin-screw multi-disc agitator, or a vertical stirring machine such as a double-helical ribbon stirring machine.

EXAMPLES

The present invention is further described with reference to the following examples, but it should be construed that the invention is in no way limited to those examples.

Example 1

Preparation of Solid Titanium Catalyst Component 7.14 g (75 mmol) of anhydrous magnesium chloride, 37.5 ml of decane and 35.1 ml (225 mmol) of 2-ethylhexyl alcohol were reacted with heating at 130° C. for 2 hours to give a homogeneous solution. To the solution, 1.67 g (11.3 mmol) of phthalic anhydride was added, and the solution was mixed with stirring at 130° C. for 1 hour to dissolve the phthalic anhydride in the homogeneous solution. The resulting homogeneous solution was cooled to room temperature, and to 200 ml (1.8 mol) of titanium tetrachloride maintained at −20° C., the whole amount of the homogeneous solution was dropwise added over a period of 1 hour. After the dropwise addition was completed, the temperature of the mixed solution was raised to 110° C. over a period of 4 hours. When the temperature reached 110° C., 5.03 ml (18.8 mmol) of diisobutyl phthalate (referred to as DIBP) was added, followed by stirring at the same temperature for 2 hours. Subsequently, the resulting solids were collected by hot filtration and resuspended in 275 ml of titanium tetrachloride, and the suspension was reacted with heating at 110° C. for 2 hours. After the reaction was completed, the solids were collected again by hot filtration and thoroughly washed with decane at 110° C. and hexane at room temperature until no titanium compound liberated in the washing liquid was detected.

The solid titanium catalyst component synthesized by the above process was stored as a hexane slurry, and a part of the solid titanium catalyst component was dried to examine the catalyst composition. The composition of the obtained solid titanium catalyst component exhibited Ti of 2.1% by weight, Cl of 58% by weight, Mg of 18% by weight and DIBP of 10.9% by weight.

Polymerization of Propylene

A 500 ml glass autoclave was purged with nitrogen, and 250 ml of decane was introduced into the autoclave, followed by replacing nitrogen with propylene. Successively, with passing propylene, the autoclave was heated to 100° C. under stirring, and 5 mmol of triethylaluminum, 0.5 mmol of cyclohexylmethyldimethoxysilane and 0.1 mmol-Ti in terms of titanium atom of the solid titanium catalyst component were added in this order. The polymerization of propylene was conducted at 100° C. for 1 hour to obtain polypropylene, while the feed rate of propylene was controlled so that the unreacted gas did not escape through the bubbler tube equipped at the purge line and the pressure in the reactor was not reduced. Subsequently, propylene was replaced with nitrogen.

Preparation of Terminal Modified Polypropylene

The polymerization slurry was maintained at 100° C., and passing air having been dried by passing through molecular sieves at a flow rate of 200 l/hr, the reaction was conducted at the same temperature for 5 hours. After the reaction was completed, the slurry was introduced into a mixed liquid of 2 liters of methanol and 2 liters of acetone, and the mixture was allowed to stand still for one night. The fibrous polymer sticking to the stirring blade was discarded.

A small amount of hydrochloric acid was added to the slurry given after allowing to stand still, and the mixture was filtered to obtain a white polymer.

The resulting polymer was washed with methanol and then dried under reduced pressure at 80° C. for 10 hours to obtain 2.5 g of terminal modified polypropylene. It was confirmed by $^{13}$C-NMR that the terminal modified polypropylene had hydroxyl groups at positions of 52% by mol of one-side-ends. The Mw of the terminal modified polypropylene, as measured by GPC, was 170,000.

Reaction of Functional Group-containing Polyolefin with Terminal Modified Polyolefin In a 500 ml glass reactor, 0.061 g (0.55 $\mu$mol, maleic anhydride group: 3.1 $\mu$mol) of maleic anhydride-modified homopolypropylene (trade name: ADMER, available from Mitsui Chemicals, Inc., Mw: 110,000, modification fraction: 0.5%), 1.0 g (5.9 $\mu$mol, hydroxyl group: 3.1 $\mu$mol) of the terminal modified polypropylene and 250 ml of toluene were placed, followed by stirring at 70° C. for 30 minutes and then at 80° C. for 4.5 hours.

From the resulting slurry, the solvent was removed by an evaporator, and the residual polymer was dried under reduced pressure at 80° C. for 10 hours to recover 1.02 g of the polymer.

The resulting polymer was measured by $^{13}$C-NMR, and it was found that all the terminal hydroxyl groups of the terminal modified polypropylene were converted into ester bonds and 5.6 olefin chains derived from the terminal modified polypropylene were linked based on one olefin chain derived from the maleic anhydride-modified homopolypropylene.

Example 2

Reaction of Functional Group-containing Polyolefin with Terminal Modified Polypropylene In a 500 ml glass reactor, 0.099 g (0.76 $\mu$mol) of a maleic anhydride-modified ethylene/propylene copolymer (trade name: TAFMER MP-0610, available from Mitsui Chemicals, Inc., obtained by modification of an ethylene/propylene copolymer having an ethylene content of 80% by mol with maleic anhydride, melt flow rate: 0.4 g/10 min, Mw: 130,000, modification fraction: 0.5%), 1.0 g (5.9 $\mu$mol, hydroxyl group: 3.1 $\mu$mol) of the terminal modified polypropylene prepared in Example 1 and 250 ml of toluene were placed, followed by stirring at 70° C. for 30 minutes and then at 80° C. for 4.5 hours.

From the resulting slurry, the solvent was removed by an evaporator, and the residual polymer was dried under reduced pressure at 80° C. for 10 hours to recover 1.02 g of the polymer. The quantity of the 23° C. decane-soluble component in the recovered polymer was 8.06% by weight. The decane-insoluble component at 23° C. was subjected to IR measurement, and as a result, a peak of an ethylene chain was detected in the vicinity of 720 cm$^{-1}$. The decane-insoluble component at 23° C. was subjected to $^{13}$C-NMR measurement, and as a result, a peak of an ester bond was detected.

Measurement of Number of Side Chains

The quantities of the decane-soluble component at 23° C. in the maleic anhydride-modified ethylene/propylene copolymer and in the terminal modified polypropylene before the reaction were 97.01% by weight and 6.01% by weight, respectively.

If the maleic anhydride-modified ethylene/propylene copolymer and the terminal modified polypropylene had not reacted at all, the quantity of the decane-soluble component at 23° C. should be 14% by weight by calculation from the following formula.

$$(1.0 \times 0.0601 + 0.099 \times 0.9701) \div (1.0 + 0.099) \times 100$$

As described above, however, the quantity of the decane-soluble component at 23° C. in the reaction product of the maleic anhydride-modified ethylene/propylene copolymer with the terminal modified polypropylene was 8.06% by weight, so that it can be seen from the following formula that 0.065 g (0.50 $\mu$mol) of PO-A was linked to decane-insoluble PO-B at 23° C.

$$(1.0 + 0.099) \times (14 - 8.06) \div 100$$

Consequently, the number of the olefin chains derived from the terminal modified polypropylene based on one olefin chain derived from the maleic anhydride-modified ethylene/propylene copolymer is calculated to be 5.8 from the following formula.

$$3.1 \times (100 - 6.01) \div 100 \div 0.50$$

Example 3

Synthesis of Terminal Iodinated Polyethylene

In a 500 ml glass container thoroughly purged with nitrogen, 250 ml of dehydrated toluene was placed, and with stirring, an ethylene gas (100 l/hr) was passed through for 20 minutes. To the container, a toluene solution of 2.5 mmol in terms of Al atom of methylaluminoxane (referred to as "MAO" hereinafter), said solution being obtained by vacuum distillation of toluene from a toluene solution of MAO available from Albemarle Corporation at 40° C. and then adding dehydrated toluene again, and 0.01 mmol of bis[7-{N-(2,4,6-trifluorophenyl)iminomethyl}indolinyl] titanium(IV) dichloride ([7-(2,4,6-F—Ph—N=CH)C$_8$H$_5$N]$_2$TiCl$_2$) were successively added and were stirred for 5 minutes with maintaining the temperature at 25° C. to perform living polymerization. The passing gas was changed to a nitrogen gas (100 l/hr), followed by stirring for 10 minutes. To the resulting polymer solution, a toluene solution of iodine (iodine: 2.5 mmol) was added, and stirring was further continued at 25° C. for 1 hour. The polymer was precipitated in 1.5 liters of methanol, filtered off and dried to obtain 0.80 g of terminal iodinated polyethylene (Mw: 65,000, Mw/Mn: 1.15).

Synthesis of Terminal Aminated Polyethylene

In 50 ml of dehydrated toluene, 0.5 g of the terminal iodinated polyethylene obtained above was slurried, and to the slurry was added 27 mg (0.15 mmol) of potassium phthalimide. The mixture was stirred with heating at 80° C. for 12 hours, followed by addition of 10 ml of hydrazine monohydrate was added, and the mixture was heat-refluxed for 2 hours. The reaction solution was cooled to room temperature and was added to 1.0 liter of methanol. The precipitating polymer was filtered off and dried to obtain terminal aminated polyethylene. It was confirmed by $^1$H-NMR and IR analysis that primary amine was present at positions of 60% by mol of one-side-ends.

Reaction of Functional Group-containing Polyolefin with Terminal Modified Polyolefin ADMER available from Mitsui Chemicals, Inc. (homopolypropylene modified with maleic anhydride, Mw: 110,000, modification fraction: 0.5%) was used as a main chain.

In a 500 ml glass reactor, 0.061 g (0.55 $\mu$mol, maleic anhydride group: 3.1 $\mu$mol) of the above main chain, 0.34 g (5.2 $\mu$mol, amino group: 3.1 $\mu$mol) of the above side chain and 250 ml of toluene were placed, followed by stirring at 70° C. for 30 minutes and then at 80° C. for 4.5 hours. From the resulting slurry, the solvent was removed by an evaporator, and the residual polymer was dried under reduced pressure at 80° C. for 10 hours to recover 0.36 g of the polymer.

The resulting polymer was subjected to $^{13}$C-NMR measurement, and it was found that all the terminal amino groups of the side chains were converted into amide bonds and 5.6 side chains were linked based on one main chain.

What is claimed is:

1. A branched polyolefin comprising an olefin chain (A) having, as main constituent units, recurring units obtained from at least one olefin selected from olefins of 2 to 20 carbon atoms and olefin chain(s) (B) consisting of recurring units obtained from at least one olefin selected from olefins of 2 to 20 carbon atoms, wherein the olefin chain (B) is linked to a position other than both ends of the olefin chain (A) through a bond having a carbonyl group, and at least one olefin chain (B) per one olefin chain (A) is present.

2. The branched polyolefin as claimed in claim 1, wherein the weight-average molecular weight (Mw) of the olefin chain (B) is not less than 5,000.

3. The branched polyolefin as claimed in claim 1, wherein the bond having a carbonyl group is an ester bond and/or an amide bond.

4. The branched polyolefin as claimed in any one of claims 1 to 3, wherein one of the olefin chain (A) and the olefin chain (B) is a crystalline polyolefin and the other is a non-crystalline polyolefin.

5. The branched polyolefin as claimed in any one of claims 1 to 3, wherein both the olefin chain (A) and the olefin chain (B) are polypropylene.

6. The branched polyolefin as claimed in any one of claims 1 to 3, wherein both the olefin chain (A) and the olefin chain (B) have stereoregularity.

7. A process for preparing a branched polyolefin, comprising allowing a functional group-containing polyolefin (C) having, as main constituent units, recurring units obtained from at least one olefin selected from olefins of 2 to 20 carbon atoms and having one or more carboxyl groups and/or acid anhydride groups at positions other than both ends to react with at least one terminal modified polyolefin (D) consisting of recurring units obtained from at least one olefin selected from olefins of 2 to 20 carbon atoms, having an olefin composition which may be the same as or different from that of the functional group-containing polyolefin (C) and having at least one group capable of reacting with a carboxyl group or an acid anhydride group at only the position of chain end to prepare the branched polyolefin of claim 1 or 2.

8. The process for preparing a branched polyolefin as claimed in claim 7, wherein the functional group-containing polyolefin (C) is a maleic anhydride-modified homopolymer or copolymer of ethylene and/or propylene.

9. The process for preparing a branched polyolefin as claimed in claim 7, wherein the terminal modified polyolefin (D) is a one-side-end modified polyolefin having a group capable of reacting with a carboxyl group or an acid anhydride group at only one-side-end.

10. A thermoplastic resin composition containing the branched polyolefin of claim 1 in an amount of 0.01 to 50% by weight.

* * * * *

UNITED STATES PATENT AND TRADEMARK OFFICE
CERTIFICATE OF CORRECTION

PATENT NO. : 6,753,378 B2
DATED : June 22, 2004
INVENTOR(S) : Kojoh, Shinichi et al.

It is certified that error appears in the above-identified patent and that said Letters Patent is hereby corrected as shown below:

Column 35,
Line 9, change "1. A branched polyolef in comprising an olefin chain (A)" to -- 1. A branched polyolefin comprising an olefin chain (A) --

Column 36,
Line 7, change "obtained from at least one clef in selected from olefins of 2" to -- obtained from at least one olefin selected from olefins of 2 --

Signed and Sealed this

Fourteenth Day of December, 2004

JON W. DUDAS
*Director of the United States Patent and Trademark Office*